(12) United States Patent
Steele et al.

(10) Patent No.: US 8,200,693 B2
(45) Date of Patent: Jun. 12, 2012

(54) DECISION LOGIC COMPARISON AND REVIEW

(75) Inventors: Michael Steele, Michigan City, IN (US); Stuart Crawford, Piedmont, CA (US); Navin Doshi, Bangalore (IN); Kashyap Babu Rao Kolipaka, Bangalore (IN); Prasun Kumar, Bangalore (IN); Sergei Tolmanov, Walnut Creek, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 409 days.

(21) Appl. No.: 12/493,010

(22) Filed: Jun. 26, 2009

(65) Prior Publication Data

US 2010/0332514 A1 Dec. 30, 2010

(51) Int. Cl.
*G06F 17/00* (2006.01)
(52) U.S. Cl. .................. 707/769; 707/759
(58) Field of Classification Search .......... 707/756, 707/769; 715/854; 711/206
See application file for complete search history.

(56) References Cited

U.S. PATENT DOCUMENTS

| 7,496,571 | B2* | 2/2009 | Benedikt et al. ............ 1/1 |
| 2006/0173753 | A1* | 8/2006 | Padmanabhan et al. ...... 705/27 |

* cited by examiner

*Primary Examiner* — Belix M Ortiz Ditren
(74) *Attorney, Agent, or Firm* — Mintz, Levin, Cohn, Ferris, Glovsky and Popeo, P.C.

(57) ABSTRACT

Techniques are described for logically comparing strategies. In one aspect the strategies can be compared by receiving a request to compare a first strategy to a second strategy, the first strategy graphically represented by a first set of linked nodes, the second strategy graphically represented by a second set of linked nodes, each set of linked nodes linking a root node to at least one action node; identifying a subset of linked nodes from at least one of the first set of linked nodes and the second set of linked nodes based on an equivalence of a first subset of the first set of linked nodes to a second subset of the second set of linked nodes; and, providing a visual depiction of the identified subset of the linked nodes to a user, the visual depiction corresponding to the equivalence of the first subset to the second subset.

13 Claims, 23 Drawing Sheets

DECISION LOGIC COMPARISON AND REVIEW

TECHNICAL FIELD

The subject matter described herein relates to the construction, review and comparison of decision logic with graphs and related user interfaces.

BACKGROUND

Strategies composed of nodes and links can represent various decision logic. Strategies can represent a series of decisions that divide a population into subsets. The decisions can be made on the basis of the values of one or more variables. Strategies can be used to assign a single course of action (which could be to take no action at all) to each population subset. One example of decision logic is described in the U.S. Pat. No. 7,000,199, incorporated by reference hereto in its entirety.

Strategies can be represented by decision tree, directed acyclic graph ("DAG") and exception-based directed acyclic graph ("EDAG") structures. Representations of strategies can have leaf nodes (sometimes referred to as "action nodes" or "end nodes"), a root node (sometimes referred to as a "start node") and nodes that appear between the leaf nodes and the root nodes (sometimes referred to as "condition nodes" or "intermediate nodes" or "split nodes"). Depending on the type of a structure representing the decision logic, the root nodes, leaf nodes and intermediate nodes can be treated differently. For example, a root node can represent the beginning of an evaluation process, the intermediate nodes can represent evaluation conditions tested on one or more variables, and the leaf nodes can represent actions that should be taken if all of the evaluation steps corresponding to the condition nodes leading to these action nodes have been successfully resolved.

Decision trees can represent each of the decisions of the decision logic in the form of a branch. Decision trees can have one and only one root (or start) node. The decisions can be represented by two or more links (also referred to as "arcs") coming out of a single node. Each branch can correspond to a set of conditions or checks that can be configured such that only one condition is true in all cases. If a condition resolves to true, a link associated with this condition can be followed further. That link can lead to either an action node (i.e., leaf node), or to another condition node. All nodes within a decision tree can have one and only one parent node.

Condition nodes of some decision trees have either a single arc to an action node or two or more arcs to condition nodes. Some decision trees can have two arcs coming out of a single condition node and leading to two action nodes. For example, two arcs coming out of a single condition node can be used to assign two actions to the two subpopulations represented by those two conditions. In some decision trees, the start node can be directly connected to a single action node. In this case, there are no branches or condition nodes at all.

Decision trees can be used for the graphical representation of complex decision logic, involving evaluations of hundreds of variables, leading to hundreds of possible outcomes. Such decision trees can require a large number of nodes that can be difficult to display and analyze.

Strategies can also be represented by a "Directed Acyclic Graph", or DAG. A DAG structure has a set of nodes connected by links. The decision process starts at a single root node (also referred to as a "start node"). Some DAGs can have nodes that either have a single link to an action node, or two or more links to condition nodes. Each link can go towards a node that has links coming in from other nodes. Consequently, a node within a DAG structure can have more than one parent node. DAG structures do not allow links that introduce cycles in the graph. In some DAG structures, a condition node can have a single link to another condition node.

Generally, there are two kinds of DAG's: non-backtracking and backtracking. In non-backtracking DAG's, all nodes link to a single action node, or they link to 2 or more condition nodes where the conditions of those nodes are set up so that one of them must evaluate to true. In this way, every member of the population will eventually get assigned a single action without having to revisit an earlier node to explore additional possible paths to an action.

In a backtracking DAG, it is possible for condition nodes to link to a single condition node, or to link to multiple condition nodes where more than one of those conditions can evaluate to true. Backtracking DAGs allow backtracking to earlier nodes to explore other possible paths if a certain condition node does not evaluate to true. However, the conditions of the nodes must be set up so that there is a path to an action node for every possible case from the population.

For example, a DAG can be used to represent decision logic by associating each condition node to one of the decisions in the decision logic. If the condition at that node resolves to true, then the decision process can proceed down one of its arcs. The decision process will eventually reach an action node that identifies the action assigned to that subpopulation, or another condition node that represents the next decision. If the condition at a node is false, then the decision process backs up to one of the unexplored links coming out of a node that was previously visited. The node conditions and arcs of the DAG can be set up so that it is guaranteed that exactly one action node is reached in all circumstances. Some forms of DAG structures just have a start node with a link directly to an action node, without any condition nodes in between.

Strategies can also be represented by an Exception Directed Acyclic Graph ("EDAG"). An EDAG structure is a set of nodes connected by links. In EDAG structures, the decision process starts at a single root node called an Exception node. The Exception node represents the action to assign unless it is possible to assign some other action by following links to one of the action nodes. In some EDAG structures, each node can have only one link going out to an action node, one link going to another exception node, or one or more links going to condition nodes. EDAG structures allow each link to go towards a node that has links coming in from other nodes. In other words, EDAG nodes can have more than one parent node. EDAG structures, just like DAG structures, do not support links that introduce cycles in the graph.

An EDAG can represent decision logic, for example, by associating each condition node to one of the decisions in the decision logic. If the condition at that node resolves to true, then the decision process can proceed down one of its arcs. The decision process can either reach an action node that identifies the action assigned to that subpopulation, or it can reach another condition node that represents the next decision. If the condition at a node resolves to false, then the decision process follows one of the unexplored arcs coming out of a node that was previously visited. In some EDAG structures, the decision process may never reach an action node. In other words, EDAG structures can support subpopulations that are not expressly assigned to any particular action node. In that case, the action represented by the most recently visited exception node can be assigned to these subpopulations. One form of an EDAG structure can be represented by a single exception node.

Decision logic can also be represented by action graphs. An action graph is a set of nodes connected by links that visually describes the population subset that is assigned a particular action by the decision logic. An action graph has a single root node (or start node) and it has a single action node. Each node has either a single link going towards the action node, or one or more links going towards condition nodes. Each link can go towards a node that has links coming in from other nodes. That is, nodes can have more than one parent node. In an action graph, you cannot set up links in such a way that introduces cycles in the graph.

An action graph represents a decision process to determine whether to assign the action represented by the action graph or not. Each condition node corresponds to one of the decisions in the strategy. Beginning at the start node, each link can be followed to either an action node or a condition node. If a condition node is reached and the condition at that node is true, then the decision process can follow one of the arcs extending from the node. If a condition node is reached and the condition at the node is false, then the decision process can back up and try following other links from previously visited nodes. If the action node is reached, then the action represented by this action graph is assigned. When there are no paths to the action node where all the decision conditions are true, this action represented by this action graph is not assigned. Decision logic can also be represented by a set of action graphs, with one action graph for each action that can be assigned by the decision logic.

Decision tree, DAG, EDAG and action graph structures can be leveled. A leveled decision tree can represent a structure in which all condition nodes aligned along a single column or row correspond to decisions checking the value of a single, identical variable. Similarly, a leveled DAG is a DAG (and a leveled EDAG is an EDAG) where all condition nodes aligned along a single column or row correspond to decisions checking the value of a single, identical variable. In addition, the conditions on nodes, and links between nodes, can be set up so that no link goes between nodes in the same level, nor does a link go from a node in a lower level to a node in a higher level. In some DAG structures, the root node can appear in its own column or row, and all the action nodes can appear in their own column or row. In some EDAG structures, the Exception node can appear in its own column or row, and all the action nodes can appear in their own column or row.

The analysis and review of strategies can involve comparisons between two or more strategies representing various decision logic. Decision logic comparison can be useful in a variety of situations, including but not limited to understanding how two candidate strategies in development are different, understanding how a challenger strategy (i.e., a proposed strategy) is different from a champion strategy (i.e., an accepted strategy), understanding the revisions made to a strategy over time, and understanding the differences between two strategies that use different leveling of variables. One example of decision logic comparison is described in the "Comparison of Decision Logic" patent application, publication number 20090063389, filed on Aug. 29, 2008 and incorporated by reference hereto in its entirety.

SUMMARY

Techniques are described for logically comparing strategies. In one aspect the strategies can be compared by receiving a request to compare a first strategy to a second strategy, the first strategy graphically represented by a first set of linked nodes, the second strategy graphically represented by a second set of linked nodes, each set of linked nodes linking a root node to at least one action node; identifying a subset of linked nodes from at least one of the first set of linked nodes and the second set of linked nodes based on an equivalence of a first subset of the first set of linked nodes to a second subset of the second set of linked nodes; and, providing a visual depiction of the identified subset of the linked nodes to a user, the visual depiction corresponding to the equivalence of the first subset to the second subset.

For example, the strategies can be compared by determining the equivalence of the first subset to the second subset by subtracting a common subset of linked nodes from the first set of linked nodes and from the second set of linked nodes. The common subset of linked nodes can also be computed by using, for example, a graph intersection operation.

In one variation, the equivalence of the first subset to the second subset can be determined by comparing at least one action node linked to the first subset and at least one action node linked to the second subset. For example, the first subset can be determined to be equivalent to the second subset if and only if all action nodes linked to the first subset are identical to all action nodes linked to the second subset. Similarly, the first subset can also be determined to be different from the second subset if and only if none of the action nodes linked to the first subset are identical to action nodes linked to the second subset.

In another variation the equivalence of the first subset to the second subset can be determined based on a bottom-up isomorphism. For example, the bottom-up isomorphism can be computed by comparing a subset of links leading to action nodes of the first set of linked nodes with a subset of links leading to action nodes of the second set of linked nodes.

In yet another variation, the equivalence of the first subset to the second subset can be determined based on a top-down isomorphism. For example, the top-down isomorphism can be computed by comparing a subset of paths leading from the root node of the first set of linked nodes with a subset of links leading from the root node of the second set of linked nodes. The equivalence of the first subset to the second subset can also be determined based on a top-down isomorphism and a bottom-up isomorphism.

The strategies can also be compared by an article with a tangible machine-readable storage medium embodying instructions that when performed by one or more machines result in determining the equivalence of the first subset to the second subset by instructions comprising: for every link immediately preceding a first action node in the first strategy, updating the first strategy by linking a first tag node to the first action node; for every link immediately preceding a second action node in the second strategy, updating the second strategy by linking a second tag node to the second action node; computing a union graph of the first updated strategy and the second updated strategy; and, determining the equivalence based on nodes of the union graph linked to the first tag node and the second tag node.

In another aspect, a set of menu entries for a user interface menu can be generated, each of the menu entries graphically representing a status of an action from at least one strategy, each strategy represented by a set of linked nodes linking a root node to at least one action node. A set of menu entries can be displayed on the display. Based on a menu entry selection signal indicative of the selection device pointing at a selected menu entry from the set of menu entries, at least a portion of at least one action graph for the action corresponding to the selected menu entry can be displayed.

The strategies can also be compared based on instructions comprising receiving a plurality of strategies for comparison, each strategy represented by at least one path of linked nodes, the at least one path linking a root node with an action node, thereby assigning at least one action to at least one population subset; selecting a first strategy from the plurality of strategies; selecting a first collection of paths from the first strategy, such that each path in the first collection of paths exists in each of the plurality of strategies; calculating a third strategy based on the first collection of paths; and, providing a visual depiction of at least a portion of the third strategy to the user.

The strategies can also be compared by receiving a first strategy and a second strategy for comparison, each strategy represented by at least one path of linked nodes, the at least one path linking a root node to an action node, thereby assigning at least one action to at least one population subset; selecting a first collection of paths from the first strategy, each path in the first collection assigning a first action to a first population subset, such that the first population subset is not assigned to the first action by the second strategy; calculating a third strategy based on the first collection of paths; and, providing a visual depiction of the third strategy.

In some implementations, the strategies can be compared by receiving a first strategy and a second strategy for comparison, each strategy represented by at least one path of linked nodes, the at least one path linking a root node to an action node, thereby assigning at least one action to at least one population subset; identifying a collection of action pairs by combining each first action of the first strategy with each second action of the second strategy, receiving a request to compute a cross pair graph for an action pair within the collection; computing a first action graph for the first action of the action pair; computing a second action graph for the second action of the action pair. If the first action is different from the second action, the first action can be removed from the first action graph and the second action can be removed from the second action graph. In some variations, a cross-pair graph can be computed by calculating an intersection graph of the first action graph and the second action graph. A visual depiction of the cross-pair graph can be provided to a user.

Some aspects of a described computer system for graph comparison comprise a method of providing and selecting from a menu on the display. The method can be implemented by computer instructions embedded in a tangible computer readable device. For example, the method can comprise generating a set of menu entries for the menu, each of the menu entries graphically representing a pair of actions from a cross-tabulation table, the pair of actions corresponding to a non-empty cross-pair graph; displaying a set of menu entries on the display; receiving a menu entry selection signal indicative of the selection device pointing at a selected menu entry from the set of menu entries; in response to the signal, displaying a cross-pair graph corresponding to the selected menu entry.

The computer readable instructions can also comprise generating a table comprising a set of rows and a set of columns, the set of rows corresponding to a collection of actions from a first strategy; the set of columns corresponding to a collection of actions from a second strategy; selecting a first row from the collection of rows, the first row corresponding to a first action from the first strategy; selecting a first column from the collection columns, the first column corresponding to a second action from the second strategy; and, marking a cell representing an intersection of the first row with the first column based on the cross-pair graph of the first action and the second action.

The strategies can also be compared by instructions comprising receiving a request to compare a first strategy to a second strategy, the first strategy represented by a first set of linked nodes, the second strategy represented by a second set of linked nodes, each set of linked nodes linking a root node to at least one action node; for every link leading to each action node in the first strategy, updating the first strategy by linking a first tag node to each action node; for every link leading to each action node in the second strategy, updating the second strategy by linking a second tag node to the second action node; computing a union graph of the first updated strategy and the second updated strategy; computing a LEFT node collection by gathering each action node of the union graph linked to the first tag node but not to the second tag node; computing a RIGHT node collection by gathering each action node of the union graph linked to the second tag node but not to the first tag node; and, providing a visual depiction based on the at least one of the LEFT and RIGHT node collections.

In some variations, the instructions can also comprise gathering ordered pairs of action nodes in the first updated strategy and the second updated strategy, wherein the ordered pairs correspond to identical actions; computing an EQUAL node collection by selecting the ordered pairs of action nodes wherein each action node has a parent other than the first tag node or the second tag node; computing an UNEQUAL node collection by selecting the ordered pairs of action nodes wherein each action node has a parent represented by either the first tag node or the second tag node; and, providing a visual depiction based on the at least one of the EQUAL and UNEQUAL node collections.

DETAILED DESCRIPTION

Techniques are described for logically comparing strategies. In one aspect the strategies can be compared by receiving a request to compare a first strategy to a second strategy, the first strategy graphically represented by a first set of linked nodes, the second strategy graphically represented by a second set of linked nodes, each set of linked nodes linking a root node to at least one action node; identifying a subset of linked nodes from at least one of the first set of linked nodes and the second set of linked nodes based on an equivalence of a first subset of the first set of linked nodes to a second subset of the second set of linked nodes; and, providing a visual depiction of the identified subset of the linked nodes to a user, the visual depiction corresponding to the equivalence of the first subset to the second subset.

Strategy Comparison Algorithms can use "Graph Union", "Graph Intersection" and "Graph Substraction" operations. "Graph Union" operation algorithm has been described in the "Converting Unordered Graphs to Oblivious Read Once Ordered Graph Representation" patent application, application Ser. No. 12/206,514, filed on Sep. 8, 2008, and incorporated by reference hereto in its entirety. "Graph Intersection" and "Graph Substraction" operation algorithms are exactly same as "Graph Union" operation algorithm except that in step 3.3.1 of the algorithm "intersection" or "subtraction" operation has to be performed instead of "union" operation.

Figure 1:
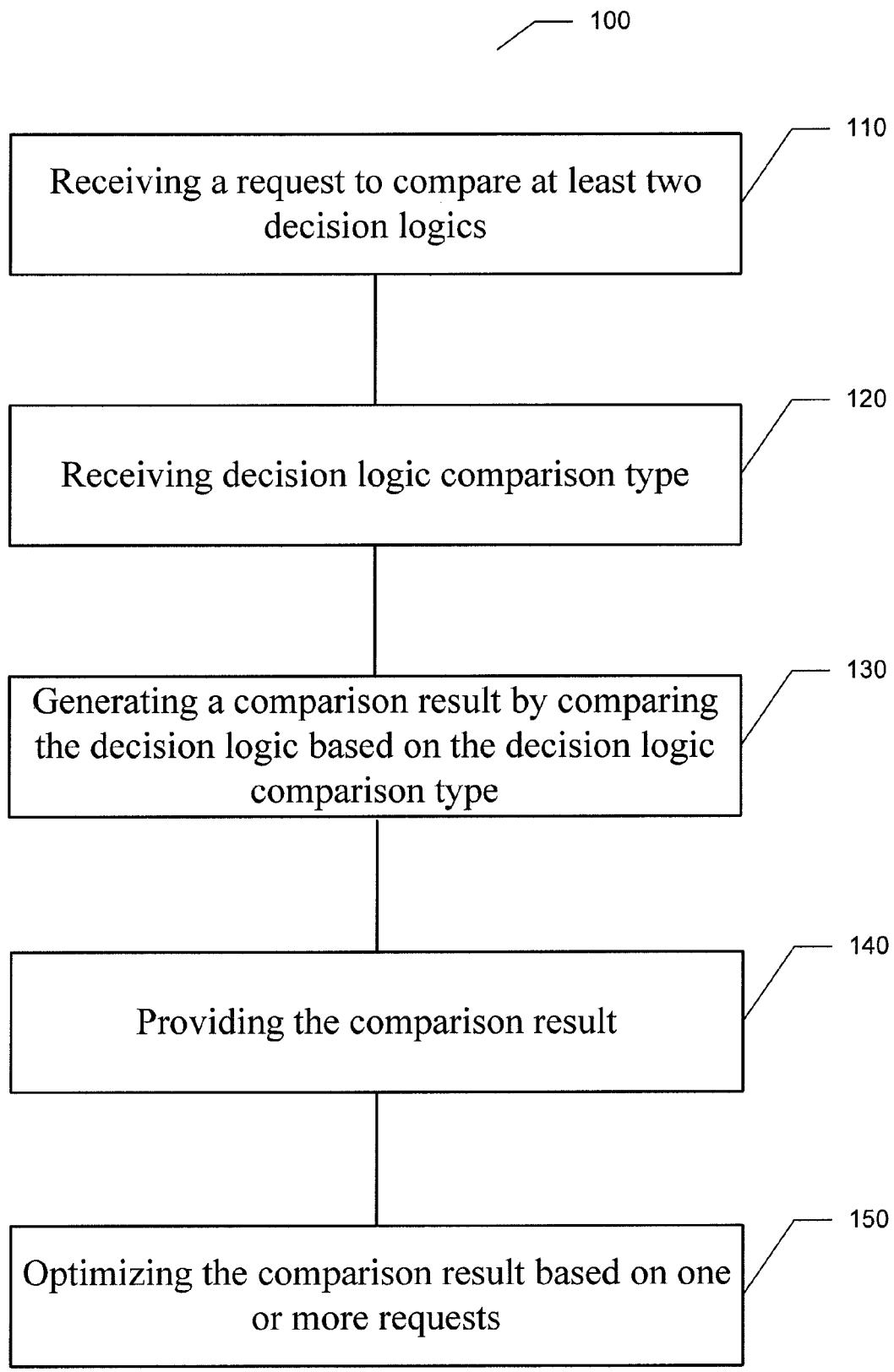
FIG. 1 provides a process flow diagram illustrating a method for comparison of decision logic.

FIG. 1 provides a process flow diagram illustrating one method for comparing decision logic 100. For example, the method 100 can be implemented by a computer processor. Specifically, at 110, a request to compare at least two different decision logics can be received. At 120, the decision logic comparison type can also be received.

At 130, a comparison result can be generated by comparing the received decision logics based on the decision logic comparison type. For example, the processor can retrieve the requested decision logics by opening two strategy files, querying two strategies from a database, or importing two strategies from a rules management or portfolio management system. In some implementations, the processor can detect if the decision logics are equivalent and initiate rendering of a corresponding message.

At 140, the comparison result can be provided to the requester. For example the requester can be a user or a computer module. At 150, the comparison result can be optimized according to the requestor's preferences. The optimization can be performed, for example, by modifying the decision logic comparison type and re-generating the comparison result. The optimization can also be performed by changing the ordering of levels, or by changing the horizontal or vertical orientation of the visual presentation of the comparison result.

Figure 2:
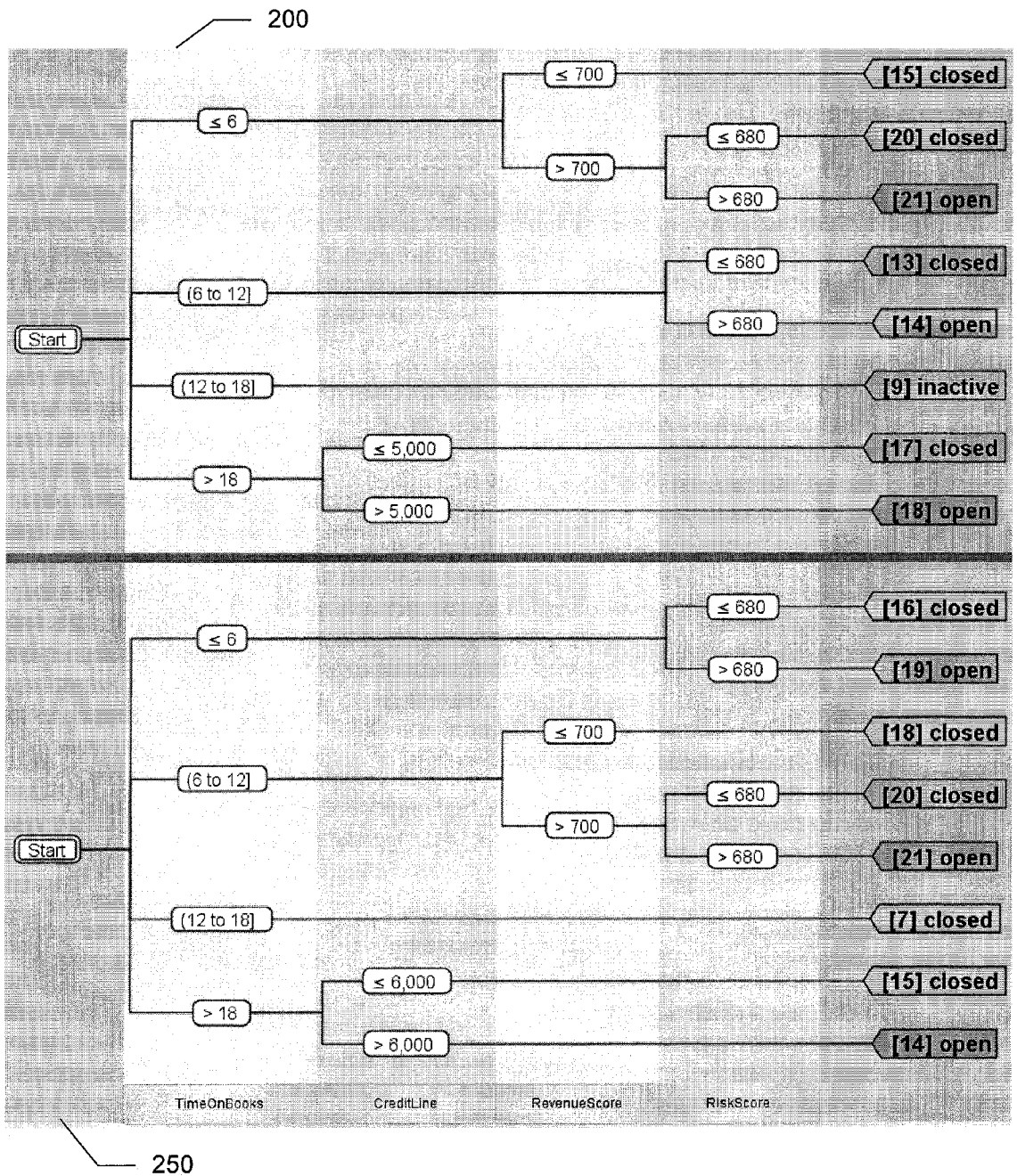
FIG. 2 provides an example of a side-by-side tree display in a horizontal layout.

In some implementations, the comparison result can be provided in a form of two strategies presented side-by-side. FIG. 2 provides an example of a side-by-side trees display provided in a horizontal layout. In the side-by-side trees display, two strategies can be compared by converting each strategy into a logically equivalent, leveled decision tree with the same level ordering as each other. The converted strategies (200 and 250) can be rendered side-by-side, displayed such that a level in the first decision tree is rendered in the same column or row as the level on the same decision key in the second decision tree.

Figure 3:
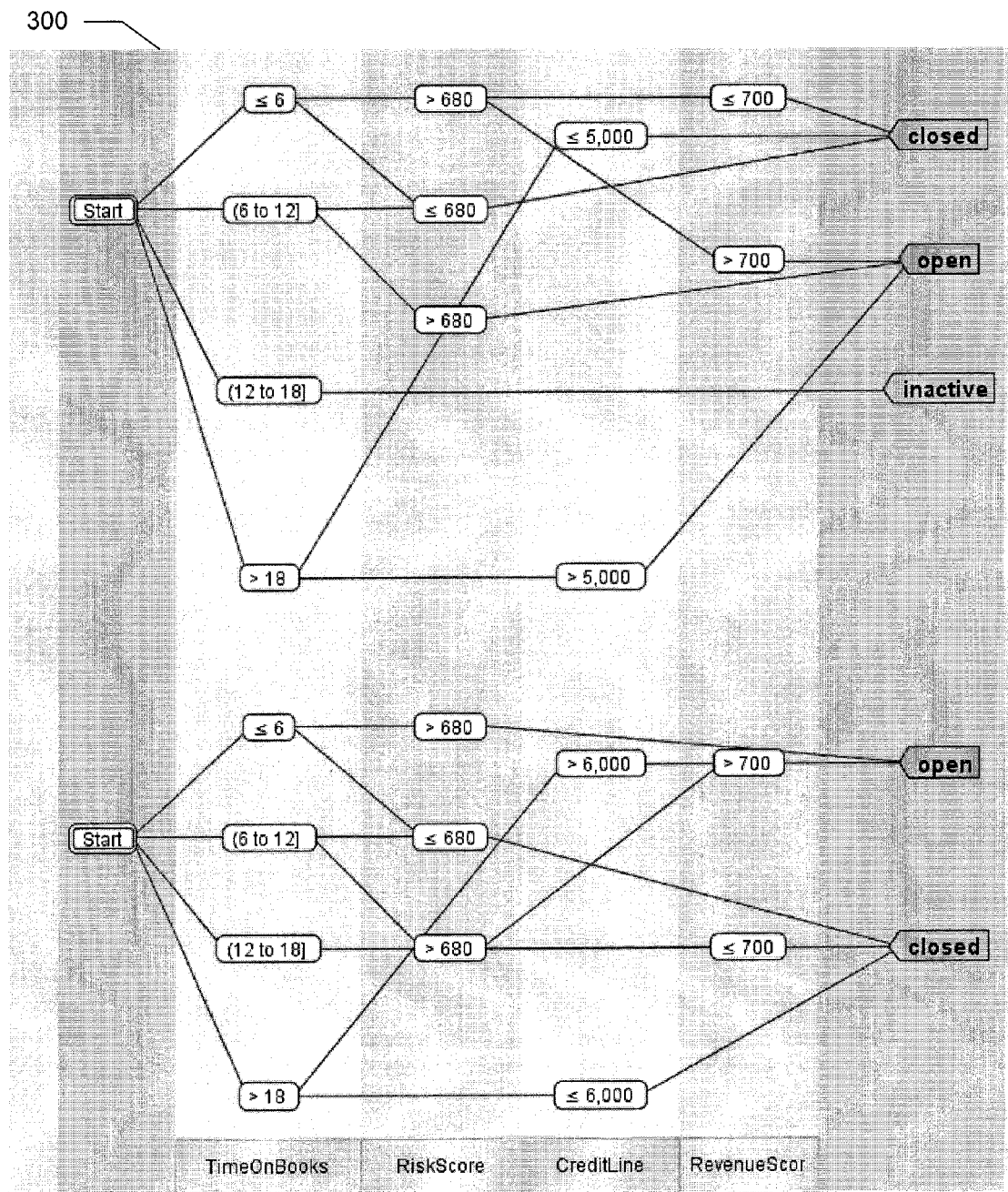
FIG. 3 provides an example of a side-by-side graph display in a horizontal layout.

The strategies can also be compared by converting both strategies into a logically equivalent, leveled DAG or EDAG structures with the same ordering of levels. Just like the decision trees, the graphs can be rendered side-by-side and displayed such that a level in the first graph is rendered in the same column or row as the level for the same decision key in the second graph. For example, FIG. 3 illustrates a side-by-side graph display 300. The display 300 depicts the same strategies shown in FIG. 2.

In some implementations, in side-by-side displays, the level for the start nodes can be rendered in the same column or row, and the level for the action nodes can also be rendered in the same column or row. The label for each level can be displayed just once. A blank space or border can separate the two trees or graphs visually. Using the same level ordering for the compared trees or graphs can simplify the identification of the behavioral differences between the strategies.

In some implementations, the processor can verify if the compared strategies are identical. If the two strategies are logically equivalent to one another, a message corresponding to this finding can be provided to the requestor (e.g. a user or a computer process).

Figure 4:
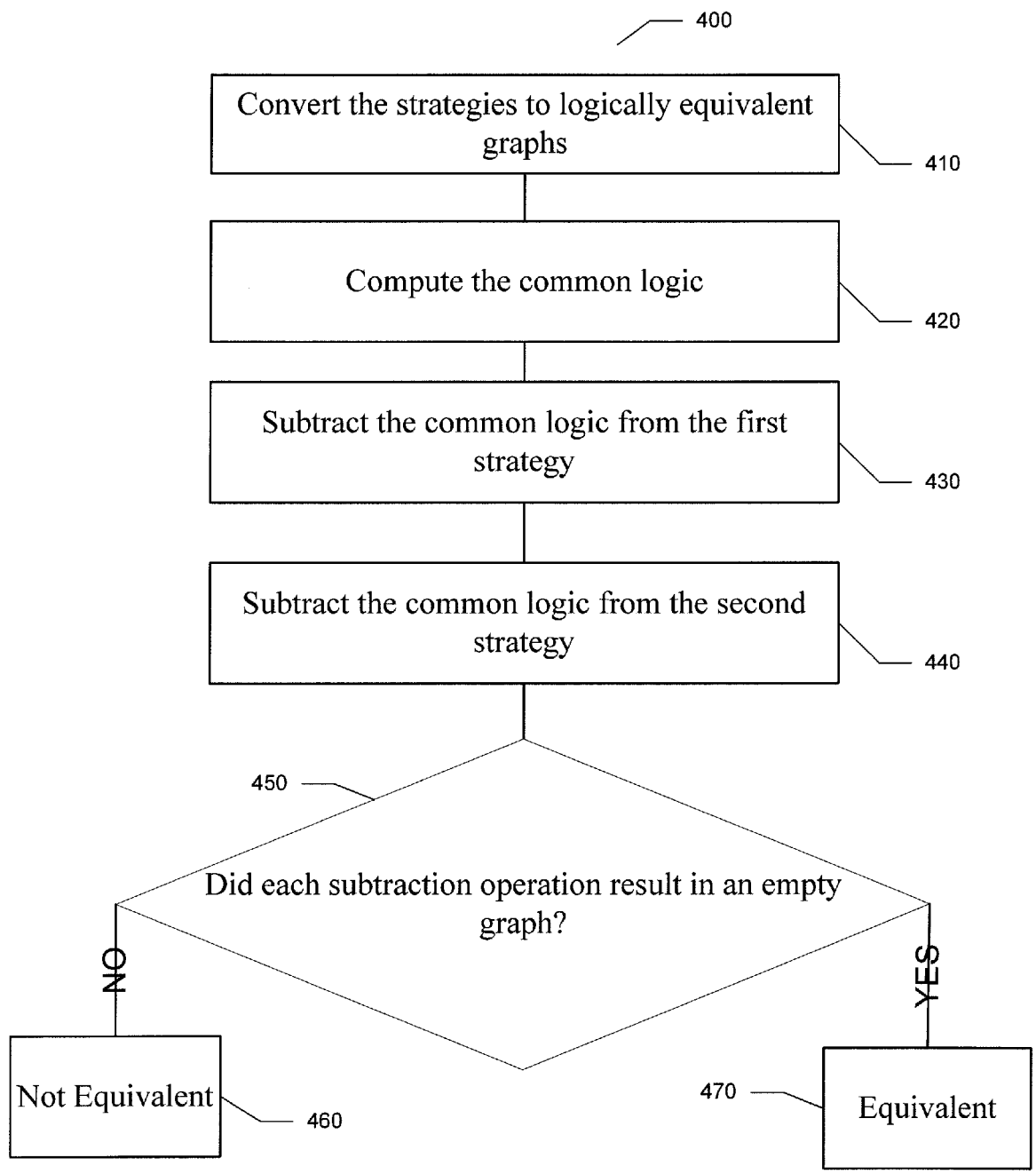
FIG. 4 provides a flow chart illustrating an exemplary method for strategy comparison.

FIG. 4 provides a flow chart illustrating one example of a method 400 that can be used for strategy comparison. According to the method 400, at 410, the strategies can be converted to logically equivalent graphs. At 420, the common logic of the graphs can be computed. For example, the common logic can be computed by using the "Graphs Intersection" algorithm discussed above.

At 430, the common logic can be subtracted from the first of the two compared strategies. For example, the common logic can be subtracted by using the "Graph Subtraction" operation referenced above.

At 440, the common logic can be subtracted from the second of the two compared strategy. Similarly, the subtraction operation can be implemented by using the "Graph Subtraction" method described above.

At 450, the result of the each subtraction operation can be verified. If each subtraction operation results in an empty graph, at 470, the determination can be made that the two compared graphs are equivalent. If at least one of the two subtraction operations does not result in the empty graph, at 460, the determination can be made that the two compared graphs are different. In other words, the two compared graphs (G1 and G2) are equivalent if and only if: Graph_Subtraction (G1, Graph_Intersection(G1, G2))=Empty_Graph AND Graph_Subtraction (G2, Graph_Intersection(G1, G2)) =Empty Graph.

In some implementations, user interface controls can be provided enabling the user to select whether to compare two strategies by viewing two trees side-by-side, two DAG's side-by-side, or two EDAG's side-by-side. The user interface controls can allow the user to select the ordering of levels that can be used for both trees or graphs. The ordering of levels can be specified by a user. The ordering of levels can also be determined automatically (e.g. based on the user's request to minimize the number of nodes in the first tree and/or the second tree or graph). A user can also request to compute the ordering of levels that would minimize the sum of nodes in the two trees or graphs.

In case where two EDAG structures are displayed side by side, user interface controls can be provided enabling the user to select which exception action to use in both EDAGs. For example, the user can specify any available exception action. The exception action can also be selected automatically. For example, the exception action can be selected to minimize the number of nodes in the first EDAG, minimize the number of nodes in the second EDAG, or, minimize the sum of nodes in the two EDAG's.

Figure 5:
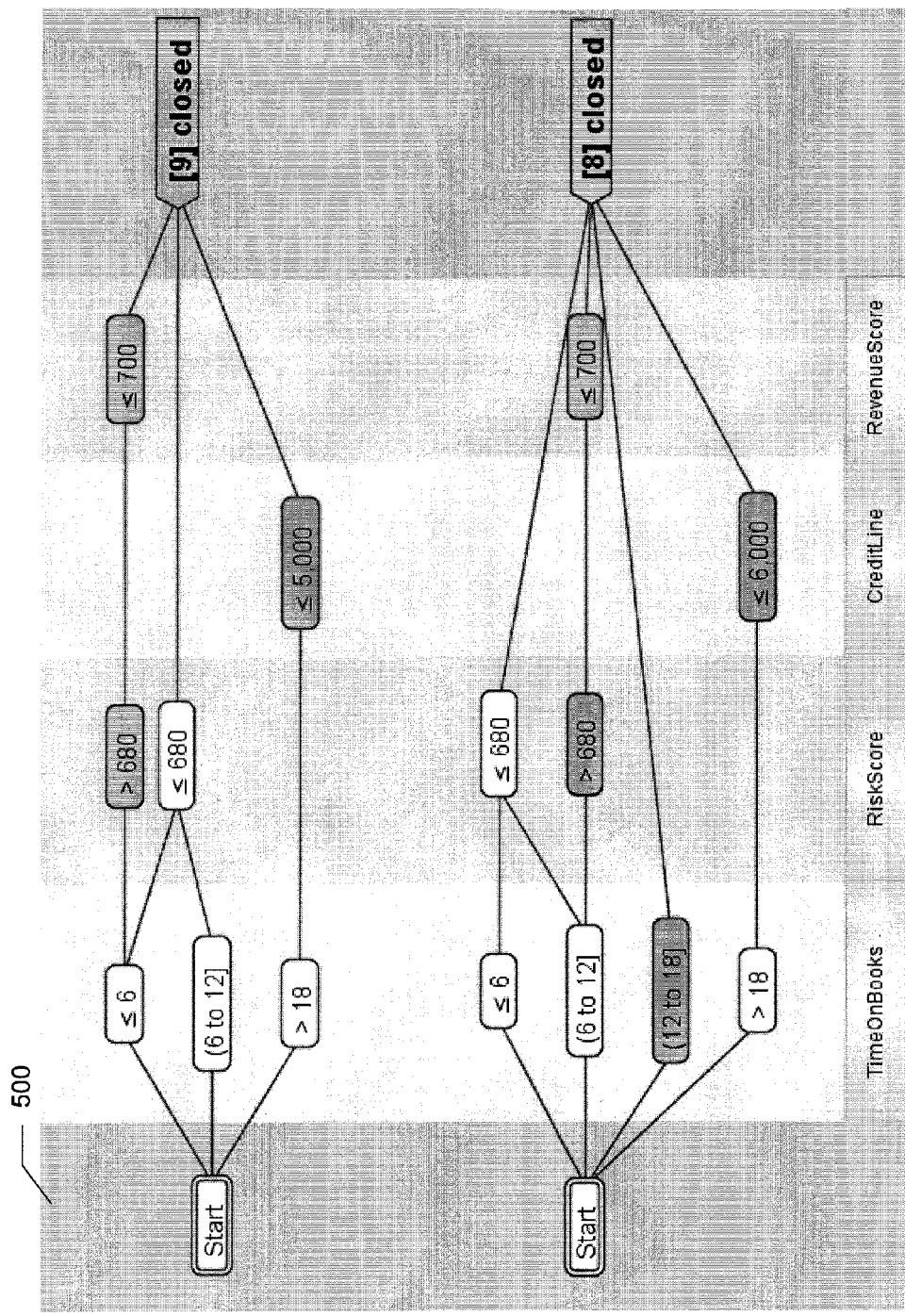
FIG. 5 provides an example of an action graph side-by-side comparison display.

FIG. 5 provides one example of action graphs side-by-side comparison display 500. FIG. 5 also illustrates one form of the "Highlighting Differences" technique, discussed below. The action graphs for the display 500 were generated for the action "closed" from the strategies shown in FIG. 2. The display on FIG. 5 can be generated in response to a user selection of an action, and the user's request to generate the action graph side-by-side comparison.

Depending on the action chosen, however, the system may display one, two or many action graphs. For example, if the user chooses an action that is assigned by two strategies, and its action graphs are different between the strategies, both action graphs can be displayed side-by-side. For example, the action graphs can be computed by using the techniques discussed in the "Visualization of Decision Logic" patent application, application Ser. No. 12/201,400, filed on Aug. 29, 2008 and incorporated by reference hereto in its entirety.

If the user chooses an action that is assigned by both strategies, but those action graphs are equivalent, just one action graph can be displayed together with a label indicating that both strategies have this same action graph. If the user chooses an action that is assigned by just one of the strategies, the action graph with a label indicating which strategy is the only strategy to assign this action can be displayed.

As illustrated in FIG. 5, both action graphs can be rendered onto the same "zebra display" such that all the nodes on the same level line up in the same row or column. The visual space needed by each action graph can be calculated, so that the action graphs can be rendered with some space or border between them.

Figure 6:
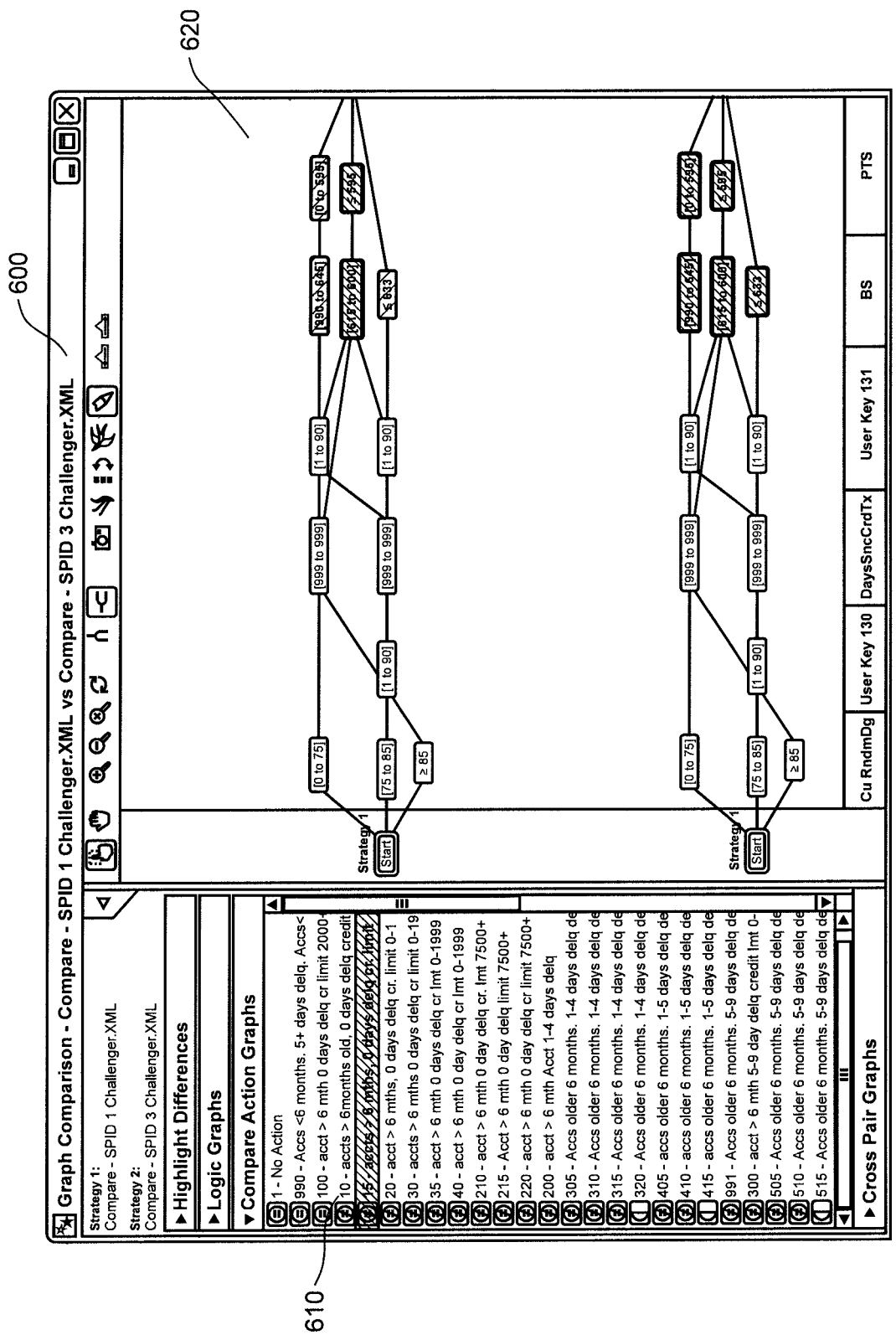
FIG. 6 provides an exemplary user interface for action comparison.

FIG. 6 provides an exemplary user interface 600 that can enable a user to select an action for comparison. Specifically, the user interface 600 can provide a list of all actions 610 that are assigned by one or both of the strategies. Each action in this list can be marked with an icon corresponding to the result of the action graph comparison. For example, an icon can indicate whether (1) the action is assigned by both strategies and the action graphs are the same, (2) the action is assigned by both strategies and the action graphs are different, (3) the action is assigned just by the first strategy, or, (4) the action is assigned just by the second strategy. Selecting an action from the list 610 can display the action graph(s) for that action in the pane 620. These icons allow the user to quickly find the action graph comparisons of most interest.

Controls provided by the User Interface 600 can also enable the user to select which ordering of levels to use for displaying both action graphs. The ordering of levels can be specified by the user. The ordering of levels can also be optimized automatically to minimize the number of nodes in the first action graph, minimizes the number of nodes in the second action graph, or, minimize the sum of nodes in the two action graphs.

The side-by-side display can be generated using the "Highlighting Differences" technique. According to this technique, nodes and arcs in the tree or graph for one strategy can be highlighted to mark the structural differences with a tree or graph for another strategy.

The graphical method of highlighting can vary. In some implementations, bright colors can be used to highlight different nodes of the displayed trees or graphs. For example, different nodes can be displayed using a translucent yellow background. Different arcs can be displayed in an orange color. The "Highlighting Differences" technique can also be used on the display of a single tree or graph, to mark the differences with an unseen second tree or graph.

Several methods can be used to identify different nodes and arcs. These algorithms include, inter alia, logical highlighting, bidirectional highlighting and subfunction highlighting. Each of these highlighting algorithms can be applied to a pair of decision trees, a pair of DAG's, a pair of EDAG's or a pair of action graphs. These highlighting algorithms can also be used to highlight the similarities between two trees or graphs. For example, some of the highlighting algorithms can be used to determine a set of nodes and arcs that are completely different. The inverse of this result can be used to highlight similar nodes and arcs.

Logical highlighting can determine a set of nodes and arcs that are completely different and a set of nodes that are partially different. The nodes in the tree or graph that are neither completely different or partially different can be highlighted as completely similar.

According to the logical highlighting technique, a node can be highlighted if some of the cases passing through this node are assigned different actions between the two strategies. In some implementations, a node can be highlighted using one color if some of the cases are assigned a different action. The nodes can be highlighted using another color if all of the cases are assigned to a different action.

Logical highlighting can be based on the concept of an "atomic decision chain". An atomic decision chain can be a set of intersecting conditions that may be treated differently by either of the two strategies. For example, the compared strategies can share the same set of atomic decision chains, which has the minimal number of atomic decision chains that are sufficient to describe all the conditional logic of both strategies.

Figure 7:
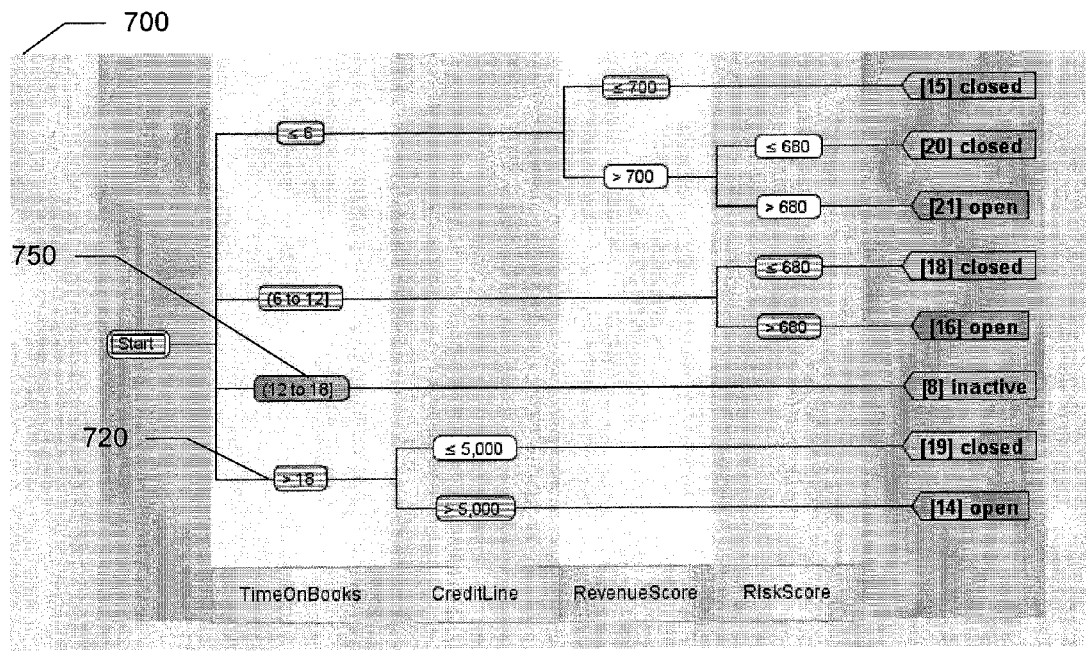
FIG. 7 provides an example of logical highlighting of differences.
Figure 7:
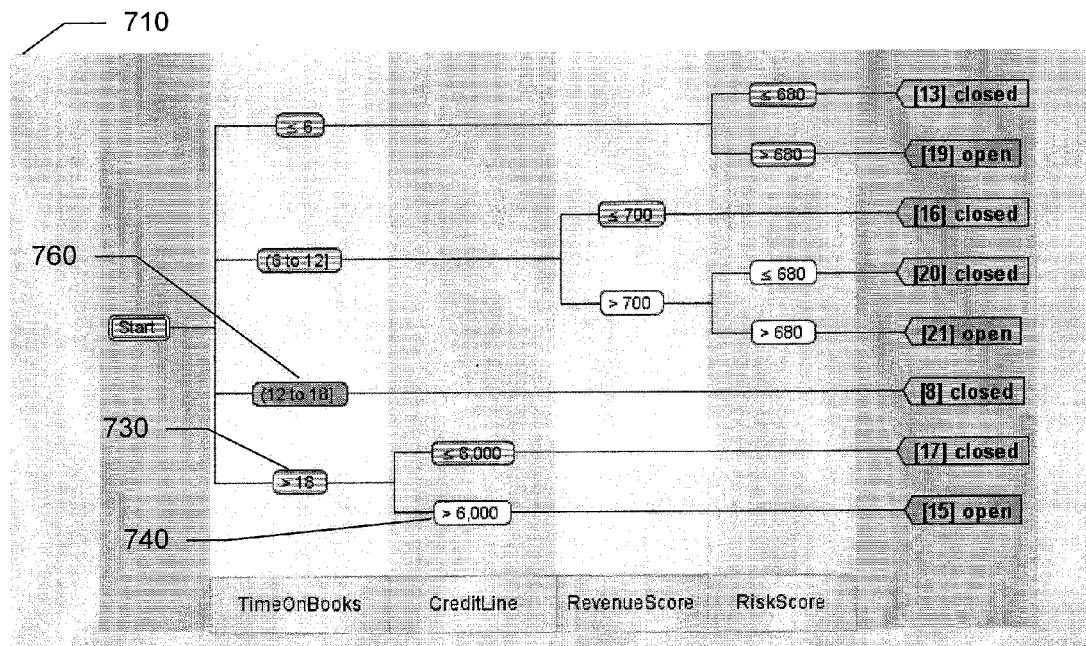

FIG. 7 provides an example of two strategies (700 and 710) with logical highlighting. In this example, nodes are highlighted in one color (e.g. deep yellow) if all the cases represented by that node are assigned a different action in the other strategy. Nodes are highlighted in another color (e.g. light yellow) if some of the cases represented by that node are assigned a different action in the other strategy.

FIG. 7 illustrates three atomic decision chains corresponding to the bottom branches of both strategies:

(TimeOnBooks>18) AND (CreditLine<=5,000)
(TimeOnBooks>18) AND (CreditLine>5,000 AND CreditLine<=6,000)
(TimeOnBooks>18) AND (CreditLine>6,000)

The node 720 of the strategy 700 and the node 730 of the strategy 710 can represent a condition evaluating the value of the "TimeOnBooks" variable. Both nodes (720 and 730) are highlighted with light yellow stripes to reflect that one of the three decision chains passing through this node (TimeOnBooks>18) AND (CreditLine>5,000 AND CreditLine<=6,000) is assigned a different action between the two strategies. Specifically, this decision chain is assigned "open" in the strategy 700, but to "closed" in the strategy 710.

The condition node 740 that tests the value of the "CreditLine" variable for the strategy 710 is not highlighted to reflect that 0 of 1 decision paths passing through this node is assigned a different action between the two strategies. That is, there is only one decision chain ((TimeOnBooks>18) AND (CreditLine>6,000)) and this decision chain is assigned the same action, "open", by the two strategies (700 and 710).

The node 750 in the strategy 700 and the node 760 in the strategy 710 are highlighted with a deeper shade of solid yellow to illustrate that 1 of 1 decision paths passing through this node is assigned a different action between the two strategies. In other words, there is only one decision chain (TimeOnBooks is in the range (12 to 18]) and it is assigned a different action between the two strategies. Specifically, this decision chain is assigned "inactive" in the first strategy, but "closed" in the second strategy.

Figure 8:
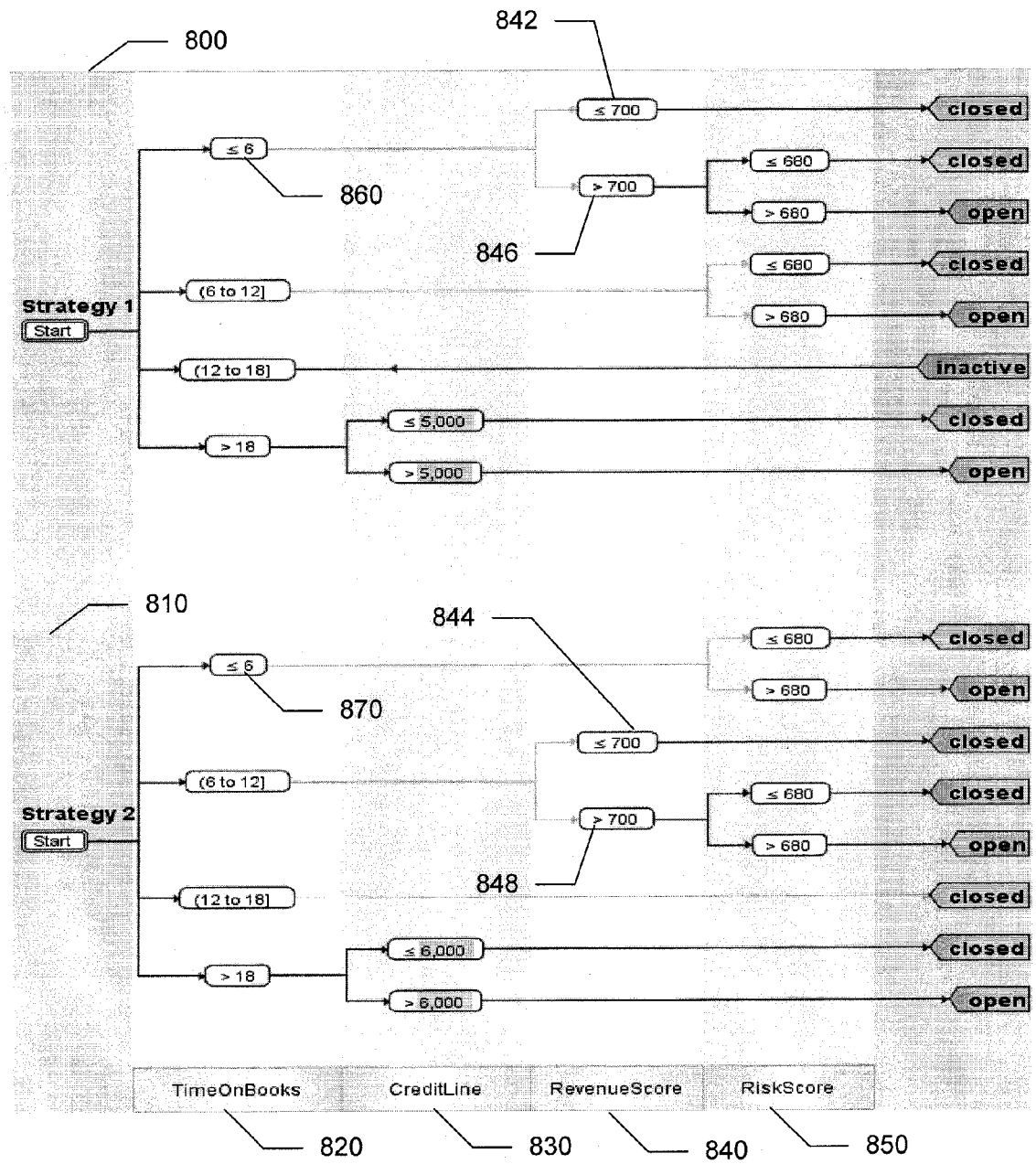
FIG. 8 provides an example of bidirectional highlighting of differences.

FIG. 8 provides an example of two strategies (800 and 810) with bidirectional highlighting. According to the bidirectional highlighting method, the nodes and arcs can be highlighted based on the determination made by a bidirectional matching algorithm. The bidirectional matching algorithm can be run on a pair of trees or graphs. In this example, nodes and arcs are highlighted if the bidirectional highlighting algorithm considers them different from the nodes and arcs in the other strategy.

The bidirectional matching algorithm can first determine a mapping between nodes in the two graphs being compared, such that two nodes are mapped together if they are considered to be the same (i.e., isomorphic). All nodes in either graph that are not in this mapping may be considered different.

Figure 9:
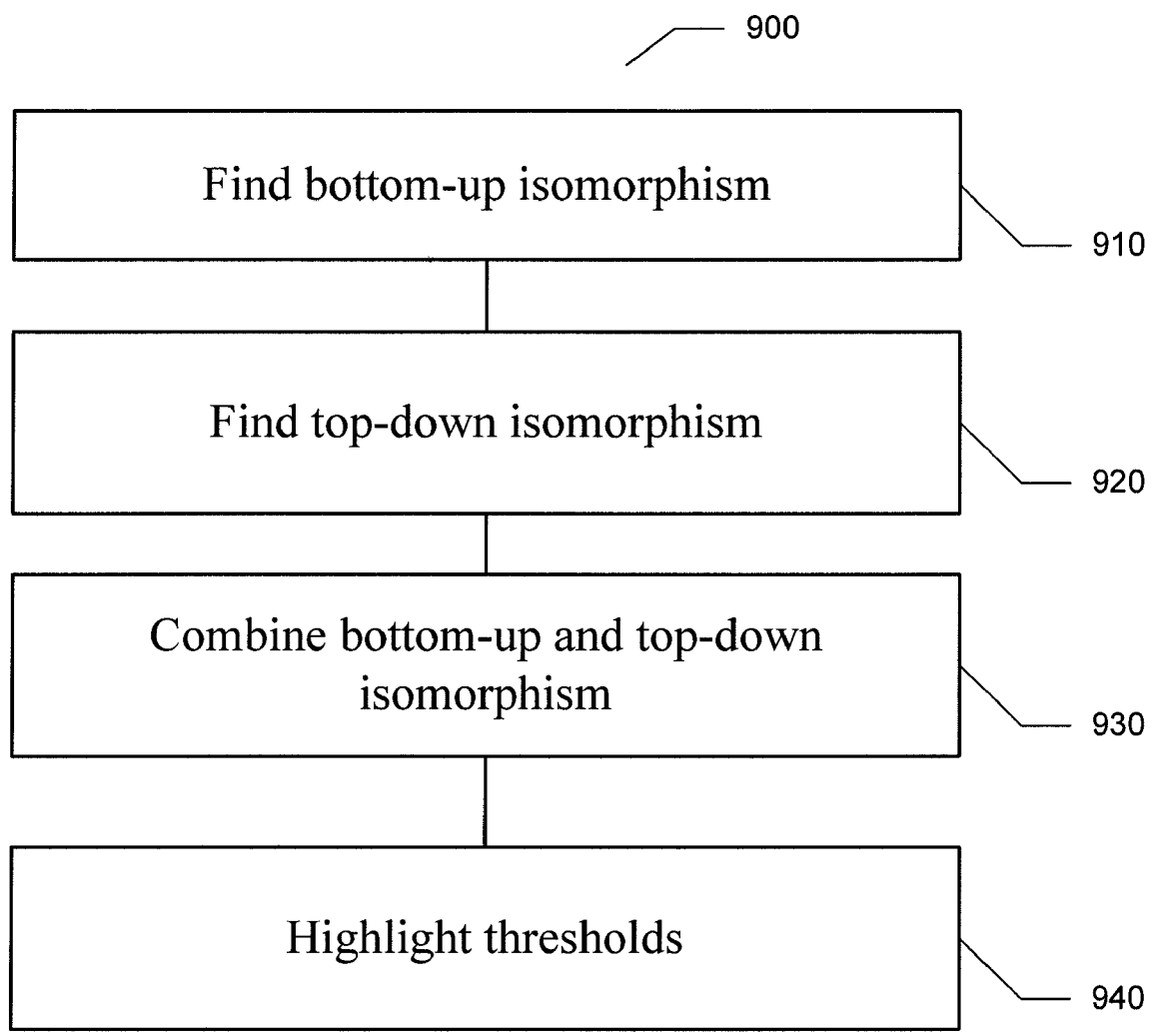
FIG. 9 provides a process flow diagram illustrating an example of the bidirectional highlighting algorithm.

FIG. 9 provides a process flow diagram illustrating one example of the bidirectional highlighting algorithm 900. At 910, the algorithm can identify nodes that are the same (isomorphic) when traversed "bottom-up" (starting at action nodes and going toward the root node), thereby identifying similarities between nodes near the action nodes of the graph. For example, a node in the left graph ($N_L$) can be matched to a node in the right graph ($N_R$) if and only if all the paths from the nodes $N_L$ and $N_R$ to action nodes are identical. In other words, for every path from $N_L$ to an action node, there exists an identical path from $N_R$ to an action node, and vice-versa. When $N_L$, $N_R$ are thus matched, they are "bottom-up isomorphic". For example, the nodes corresponding to RevenueScore 840 and RiskScore 850 in FIG. 8 are bottom-up isomorphic for both strategies. For example, the top node 842 "<=700" for "RevenueScore" in strategy 800 is bottom-up isomorphic to the top node 844 "<=700" for "RevenueScore" in strategy 810 because they have the same conditions and because they point to the same action node. Similarly, the node 846 ">700" in strategy 800 is bottom-up isomorphic with the node 848 ">700" in strategy 810 because they have the same condition and all their descendants are the same.

With the continuous reference to FIG. 9, at 920, the algorithm can identify nodes that are isomorphic when traversed "top down"—starting at the root and going toward the action nodes, thereby identifying similarities between nodes near the root of the graph. At 930, all identified isomorphic nodes can be combined in a single collection. In some implementations, at 940, nodes that are determined to be different solely because of a threshold difference, and not because of differences in their ancestors or descendants or condition variables, can be marked with a special highlighting to indicate that only the threshold is different.

This process is called "bidirectional matching" because it finds matching nodes by both traversing "bottom up" and "top down". A matching process that is only "bottom up" may not detect similarities at the top of the graph. A matching process that is only "top down" may not detect similarities near the bottom of the graph. One of the advantages of the bidirectional matching process is that similarities in the graphs can be determined both at the top and bottom of the graph.

Figure 10:
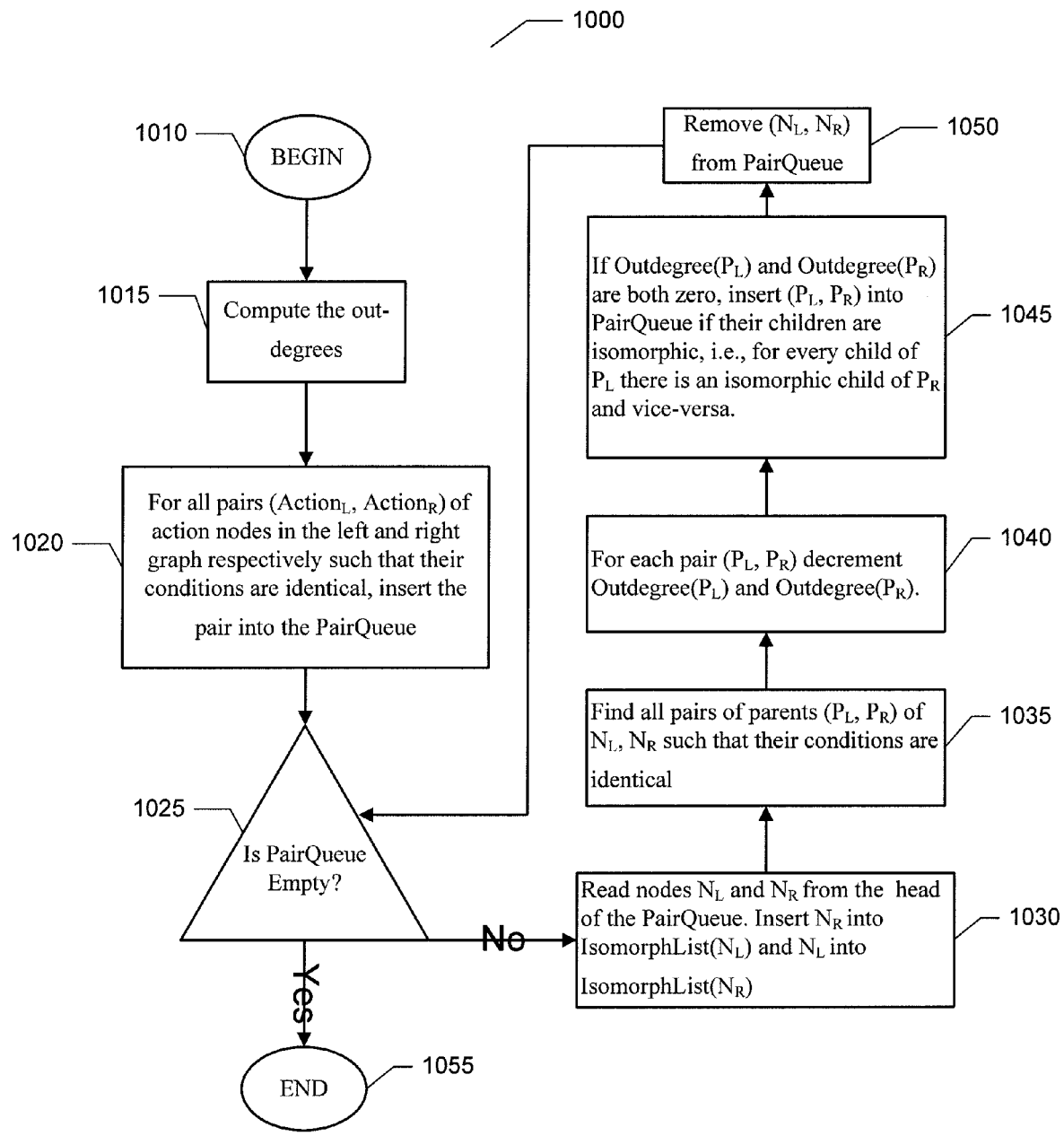
FIG. 10 provides an example of the process flow diagram that can be used to identify isomorphic nodes when traversed "bottom-up".

FIG. 10 provides an example of the process flow diagram 1000 that can be used to identify isomorphic nodes when traversed "bottom-up". The process flow diagram provides an example of comparison of nodes $N_L$ of the "left" graph to nodes $N_R$ of the "right" graph. If N is a node in either of the graphs, IsomorphList(N) can represent the list of nodes isomorphic to N and Outdegree(N) can represent the out-degree of N. At 1010, the process can begin. At 1015 the out-degrees of all the nodes can be computed. For example, the out-degrees can be computed by initializing all the out-degrees to zero and iterating over arcs in both the graphs, starting from the root node towards the action nodes, and, for each arc increment the out-degree of the source node by 1.

The process can also compute all pairs of isomorphic nodes. Pairs of isomorphic nodes whose parents have not been checked for isomorphism can be maintained in a "PairQueue" queue. For example, at 1020, the isomorphic nodes can be computed by inserting all pairs of action nodes (Action$_L$, Action$_R$) from the left and right graph respectively such that their conditions are identical into the PairQueue.

At 1025 the PairQueue can be verified. If the queue is not empty, at 1030, take off the pair of nodes at the head of the PairQueue ($N_L$, $N_R$), $N_L$ can be inserted into a list of nodes isomorphic to node $N_R$, IsomorphList($N_R$), and $N_R$ can be inserted into a list of nodes isomorphic to node $N_L$, IsomorphList($N_L$).

At 1035, the algorithm can find all pairs of parent of nodes $N_L$ and $N_R$ such that the conditions of the parent nodes are identical.

At 1040, for each pair of parent nodes ($P_L$, $P_R$), the Outdegree($P_L$) and Outdegree($P_R$) can be decremented. At 1045, if Outdegree($P_L$) and Outdegree($P_R$) are both zero, the pair of nodes ($P_L$, $P_R$) can be inserted at the tail of the PairQueue, provided that the children of $P_L$ and $P_R$ are isomorphic (i.e. for every child of $P_L$ there is an isomorphic child of $P_R$ and vice-versa). At 1050, nodes $N_L$ and $N_R$ can be removed from the PairQueue. At 1025, the process above can be repeated to make sure that all records in the PairQueue are processed.

A similar algorithm can be used to identify the top-down isomorphic nodes. For example, a node $N_L$ in the left graph can be matched to a node $N_R$ in the right graph if and only if all the paths leading to them from the start node are identical. In other words, for every path from the start node of the left graph to $N_L$, there exists an identical path from the start node of the right graph to $N_R$ and vice-versa. The matched $N_L$ and $N_R$ nodes will be "top-down isomorphic".

Figure 11:
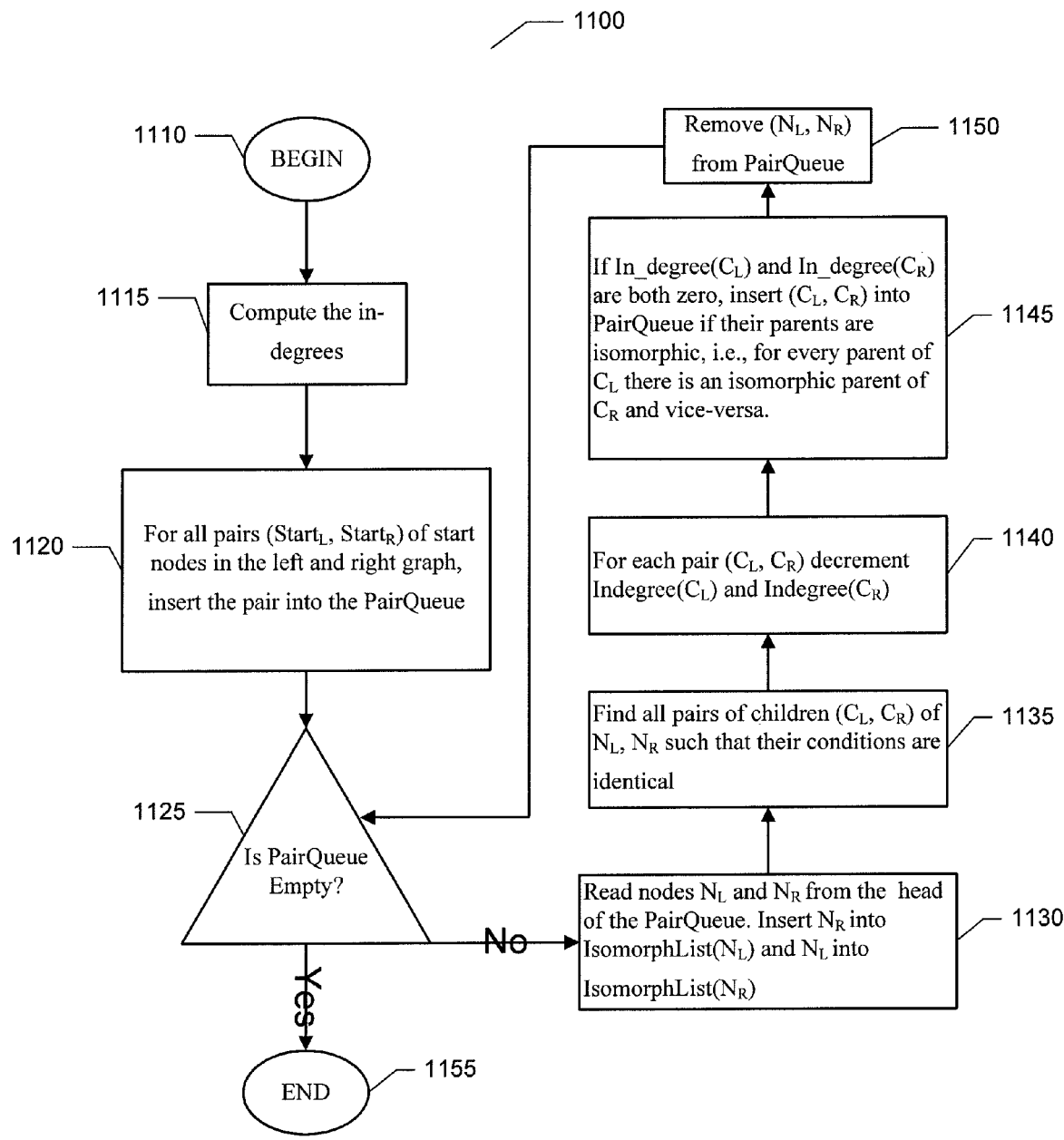
FIG. 11 illustrates a process flow that can be used by an algorithm for computing pairs of top-down isomorphic nodes.

FIG. 11 illustrates a process flow that can be used by an algorithm for computing pairs of top-down isomorphic nodes. At 1110, the process can begin. At 1115 the in-degrees of all the nodes can be computed. For example, the in-degrees can be computed by initializing all the in-degrees to zero and iterating over arcs in both the graphs, starting from the action nodes towards the root node, and for each arc increment the in-degree of the source node by 1.

The process can also compute all pairs of isomorphic nodes. Pairs of isomorphic nodes whose children have not been checked for isomorphism can be maintained in the "PairQueue" queue. For example, at 1120, insert all pairs of start nodes (Start$_L$, Start$_R$) from the left and right graph respectively into the PairQueue.

At 1125 the PairQueue can be verified. If the queue is not empty, at 1130, take off the pair of nodes at the head of the PairQueue ($N_L$, $N_R$), $N_L$ can be inserted into a list of the isomorphic nodes IsomorphList($N_R$) and $N_R$ can be inserted into a list of isomorphic nodes IsomorphList($N_L$).

At 1135, the algorithm can find all pairs of children of nodes $N_L$ and $N_R$ such that the conditions of the children nodes are identical. At 1140, for each pair of child nodes ($C_L$, $C_R$), the Indegree($C_L$) and Indegree($C_R$) can be decremented. At 1145, if Indegree($C_L$) and Indegree($C_R$) are both zero, the pair of nodes ($C_L$, $C_R$) can be inserted into PairQueue, provided that the parents of $C_L$ and $C_R$ are isomorphic (i.e. for every parent of $C_L$ there is an isomorphic parent of $C_R$ and vice-versa). At 1150, nodes $N_L$ and $N_R$ can be removed from the PairQueue. At 1125, the process above can be repeated to make sure that all records in the PairQueue are processed.

One example of the top-down isomorphic nodes is illustrated in FIG. 8. Specifically, the start nodes and all nodes in the level for TimeOnBooks 820 in both strategies are top-down isomorphic because all the paths leading to them from the start nodes are identical. In other words, for every path from the start node of the left graph to $N_L$, there exists an identical path from the start node of the right graph to $N_R$ and vice-versa.

After the top-down and the bottom-up isomorphic nodes are identified, it is possible to identify the set of nodes in each graph that are considered different. For example, the different nodes can be identified by subtracting the combination of the top-down and bottom up isomorphic nodes from the set of nodes in each graph.

The combination of the top-down and bottom up isomorphic nodes can also be used to identify identical paths from start nodes to action nodes. For example, if a portion of the path includes nodes that are neither top-down nor bottom-up isomorphic, that portion of the path can be highlighted as different. If a part of the path connects bottom-up isomorphic nodes and the remaining part connects top-down isomorphic nodes, the path may be identical and it needs to be determined as described below.

In some implementations of bidirectional highlighting at the time of combining the results of top-down and bottom up isomorphism, it is possible that the nodes are isomorphic but the edges connecting them are not identical. This can happen for the edges connecting top-down isomorphic nodes with the bottom-up isomorphic nodes. The edges can be identified by visiting the children of all the bottom-most nodes in top-down isomorphism and checking if these children are bottom-up isomorphic.

FIG. 8 illustrates an example of the different paths. Specifically, the arcs stemming from the node 860 in the strategy 800 and the arcs stemming from the node 870 in the strategy 810 are highlighted as different.

Some implementations of bidirectional highlighting can determine when just the threshold between two nodes is different and highlight the two nodes accordingly. For example, for every pair of top-down isomorphic nodes, their children can be highlighted if and only if: (1) they have the same number of children, (2) the children are sorted in the order of their conditions (in some implementations this may only be possible for numerical conditions), and, (3) the children lists of these children are bottom-up isomorphic (in other words, for every node in one list, there is a node in the other list with which it is isomorphic and vice-versa).

FIG. 8 illustrates one example of the threshold highlighting. Specifically, condition nodes that test CreditLine 830 are partially highlighted, thereby providing an indication of threshold differences between the corresponding nodes of both strategies.

The bidirectional highlighting algorithm, however, can be implemented by using many different techniques. For example, the identical (isomorphic) nodes between the two graphs can be identified if they only satisfy the top-down isomorphism requirement. In other words, the two nodes can be considered the same if and only if they are matched using the top-down isomorphic algorithm described above. The isomorphic nodes between the two graphs can also be identified if and only if they are matched using the bottom-up isomorphic algorithm described above.

The isomorphic nodes can also be identified according to the "Root-down" algorithm. The "Root-down" algorithm can be implemented identical to the bidirectional algorithm, except a few differences. First, the "Root-down" algorithm can consider two nodes to be "bottom-up isomorphic" if any one path from the two nodes to the action nodes is identical. Similarly, the "Root-down" algorithm can consider two nodes to be "top-down isomorphic" if any one path from the start node to those two nodes is identical.

Second, the "Root-down" algorithm may not require calculation of out-degree and in-degree parameters for each node. Third, unlike the bidirectional algorithm described above that inserts ($P_L$, $P_R$) into the PairQueue if all of their children are isomorphic, the "Root-down" algorithm can insert into the PairQueue every pair ($P_L$, $P_R$) where at least one child is isomorphic.

A subfunction highlighting algorithm can also be used to compare the strategies. Subfunction highlighting can use the subfunction comparison algorithm to determine which nodes to highlight as different. The subfunction comparison algorithm can be run on a pair of trees, but in the example below the subfunction comparison algorithm is described as applicable to a pair of graphs: a "left" graph and a "right" graph. Specifically, the subfunction comparison algorithm can operate by introducing a new variable in both the graphs that identifies the graph being compared, calculating the union of these two graphs in order to find a set of common nodes and arcs, splitting the union graph into two graphs representing the original strategies, and highlighting all nodes and arcs not found to be common as "different".

Figure 12:
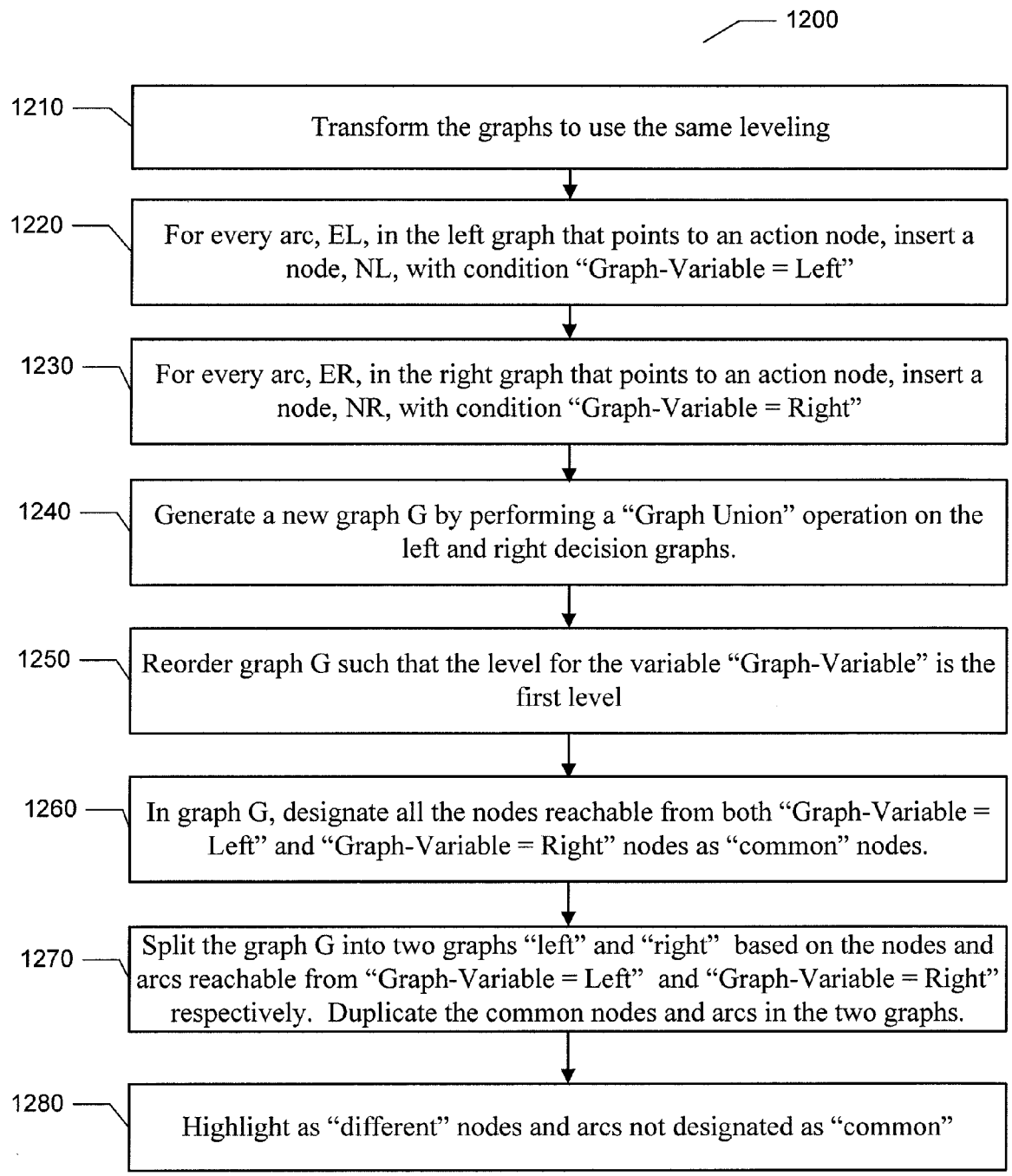
FIG. 12 illustrates one example of a process flow that can be implemented by the subfunction comparison algorithm.

FIG. 12 illustrates one example of a process flow that can be implemented by the subfunction comparison algorithm. At 1210, the "left" and "right" graphs can be transformed to use the same leveling. Any order of variables can be selected. For example, an order of variables which can be computed quickly can be used for transforming the graphs to use the same leveling.

At 1220, for every arc, $E_L$, in the left graph that points to an action node, insert a tag node $N_L$ with condition as "Graph-Variable=Left". For example, this can be implemented by inserting a node, $N_L$, with condition "Graph-Variable=Left" and adding an arc from the source node of $E_L$ to $N_L$, adding an arc from $N_L$ to the target node of $E_L$, and deleting $E_L$.

At 1230, for every arc, $E_R$, in the right graph that points to an action node, insert a tag node $N_R$ with condition as "Graph-Variable=Right." For example, this can be implemented by inserting a node, $N_R$, with condition "Graph-Variable=Right" and adding an arc from the source node of $E_R$ to $N_R$, adding an arc from $N_R$ to the target node of $E_R$, and deleting $E_R$.

At 1240, a "Graph Union" operation on the left and right decision graphs can be performed, thereby generating a new graph "G". At 1250, the graph "G" can be reordered such that the level for the variable "Graph-Variable" is the first level (the level just below the start level). At 1260, all nodes reachable from both "Graph-Variable=Left" and "Graph-Variable=Right" nodes can be designated as "common" nodes. One example of the "Union" operation is described in the "Converting Unordered Graphs to Oblivious Read Once Ordered Graph Representation" patent application, application Ser. No. 12/206,514, filed on Sep. 8, 2008, and incorporated by reference hereto in its entirety.

Figure 13:
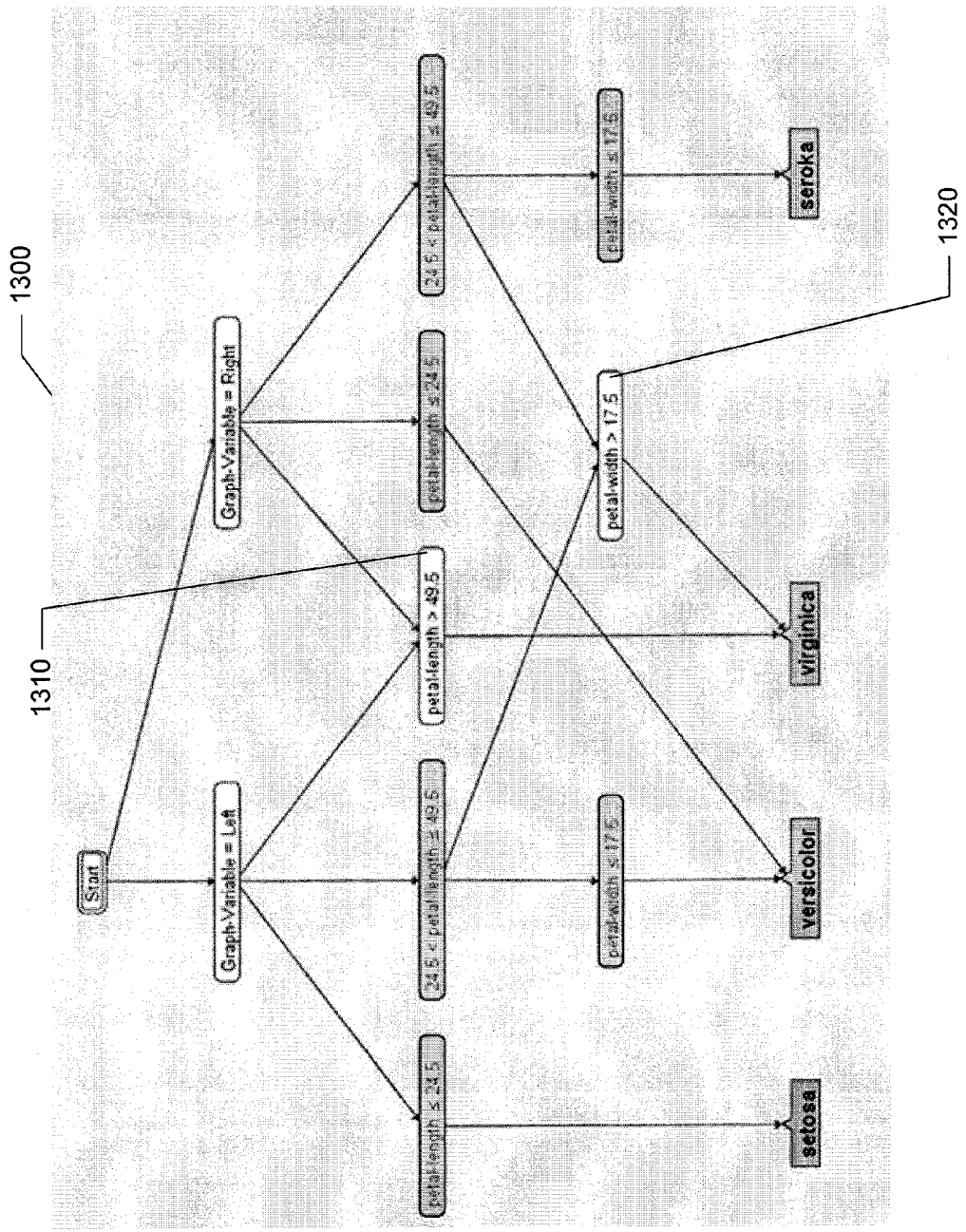
FIG. 13 illustrates an example of a union graph.

FIG. 13 illustrates an example of a union graph 1300. The nodes "petal-length>49.5" 1310 and "petal-width>17.5"

1320 are reachable from both "Graph-Variable=Left" and "Graph-Variable=Right" nodes. Consequently, the nodes 1310 and 1320 can be designated as "common" nodes. All other conditional nodes in the union graph 1300, however, can only be reached by one of the "Graph-Variable" nodes. Consequently, these nodes can be highlighted as "different."

With the continuous reference to FIG. 12, at 1270, the graph G can be split into two graphs "left" and "right" based on the nodes and arcs reachable from "Graph-Variable=Left" and "Graph-Variable=Right" respectively. The common nodes and arcs in the two graphs can be duplicated. At 1280, nodes and arcs not designated as common can be highlighted as different.

The decision logic can also be compared by using similarity graphs. A similarity graph can show all decision chains that are assigned the same action by two or more strategies. A similarity graph can provide a visual description of the subpopulation that is treated the same way by all strategies being compared. One similarity graph can be computed for many compared strategies due to its ability to show all the decision chains that receive the same action.

Figure 14:
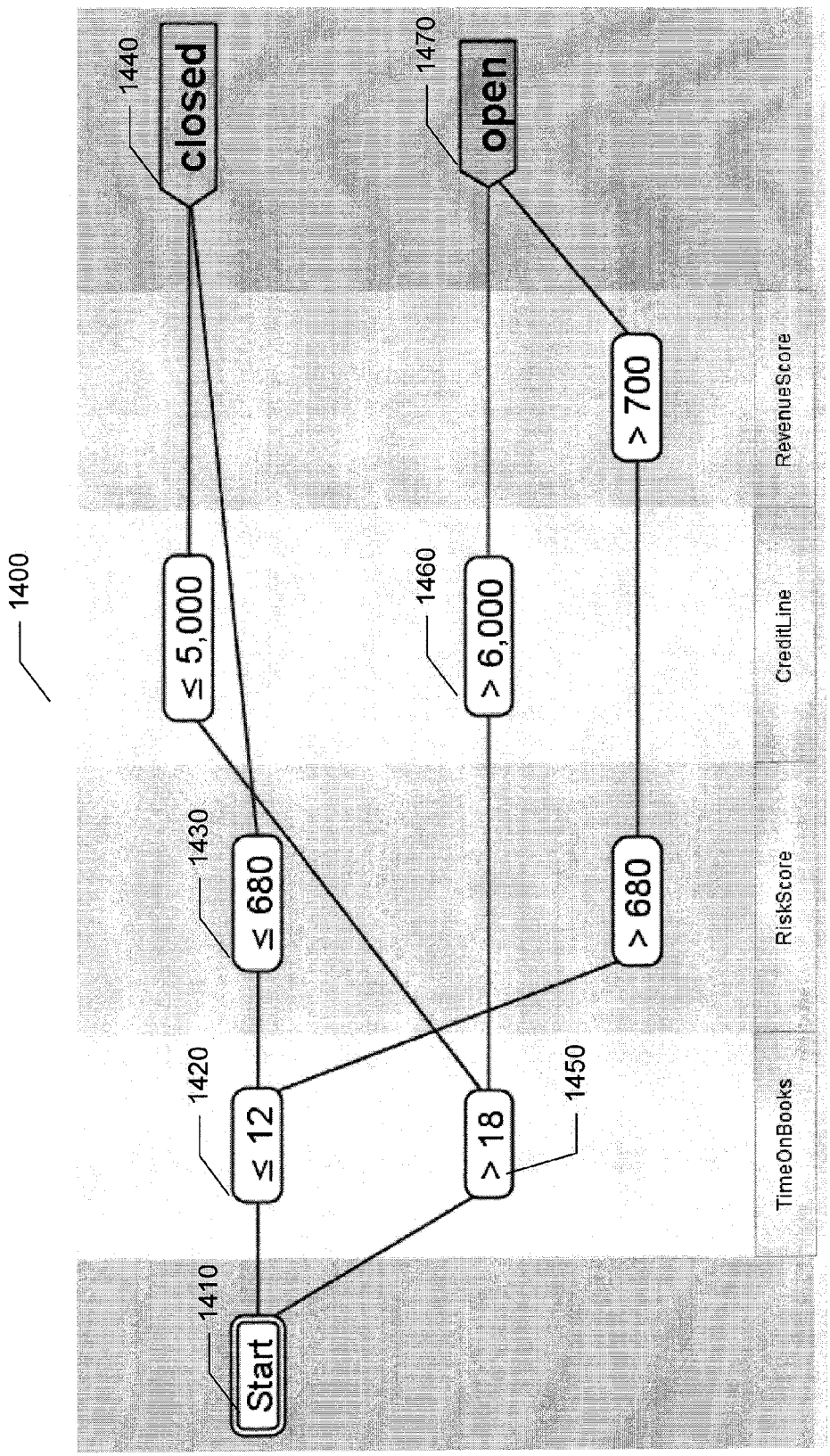
FIG. 14 illustrates an example of a similarity graph.

FIG. 14 illustrates an example of the similarity graph 1400 for the strategies compared in FIG. 2. On a similarity graph, each path from the start node to an action node represents conditions that are assigned the same action in all the strategies being compared (in this case, two strategies). The graph in FIG. 14 has a path from the start node 1410 through the "≦12" node 1420 on TimeOnBooks through the "≦680" 1430 node on RiskScore to the "closed" action node 1440. This path illustrates that all cases where (TimeOnBooks≦12 AND RiskScore≦680) are assigned the "closed" action in both strategies being compared.

Similarly, this graph has a path from the start node 1410 through the ">18" node 1450 on TimeOnBooks through the ">6,000" node 1460 on CreditLine to the "open" action node 1470. This path illustrates that all cases where (TimeOnBooks>18 AND CreditLine>6,000) are assigned the "open" action in both strategies being compared.

Difference graphs can also be used for strategy comparison. A difference graph can show all decision chains that are assigned a different action by two or more strategies. A difference graph can visually describe a subpopulation that is treated differently by the strategies being compared. A difference graph can also show the logic from one strategy assigning actions to that subpopulation. A separate difference graph can be generated for every compared strategy.

Figure 15:
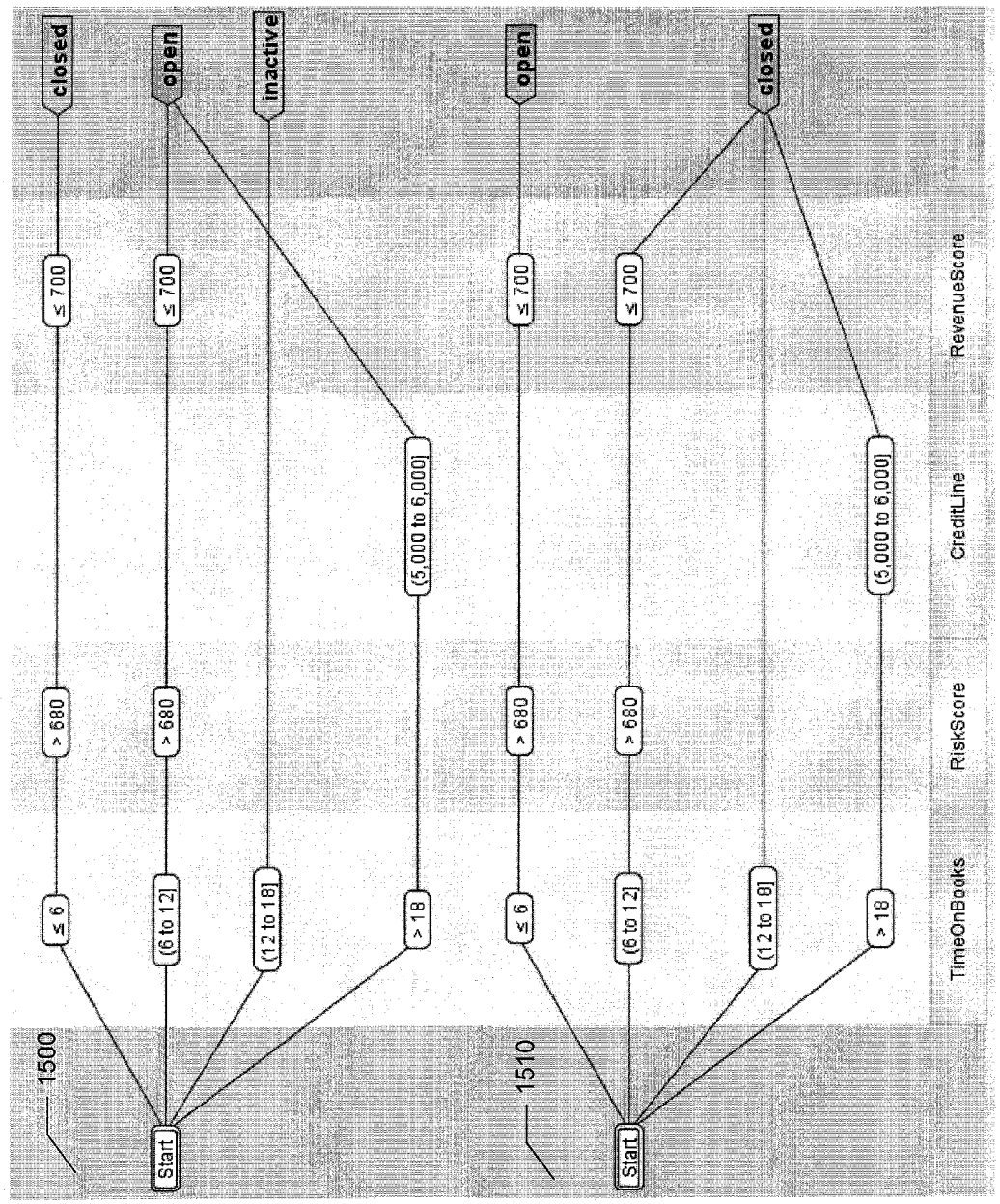
FIG. 15 illustrates an example of two difference graphs.

FIG. 15 illustrates two difference graphs (1500 and 1510) for the strategies compared in FIG. 2. The graph 1500 represents the difference graph for the strategy 200 when compared to strategy 250 in FIG. 2. The graph 1510 represents the difference graph for the strategy 250 when compared to strategy 200 in FIG. 2. Each difference graph shows how the corresponding strategy assigns actions to the subpopulation that receives different actions between the two strategies.

Both graphs have a path at top from the start node through the "≦6" node on TimeOnBooks, through the ">680" node on RiskScore, through the "≦700" node on RevenueScore. But in the top graph 1500, this path leads to the "closed" action node and in the bottom graph 1510, this path leads to the "open" action node. This means that all cases where (TimeOnBooks≦6 AND RiskScore>680 AND RevenueScore≦700) are assigned the "closed" action by the first strategy, and are assigned the "open" action by the second strategy. In other words, the (TimeOnBooks≦6 AND RiskScore>680 AND RevenueScore≦700) decision chain gets treated differently by the two strategies, and each difference graph shows how one strategy treats that decision chain.

The difference graphs can be displayed side-by-side. The side-by-side presentation of the difference graphs can display the levels on the same decision key in the same row or column. The level for action nodes can also be displayed in the same row or column. Comparing the difference graphs can be easier than comparing the graphs for the complete strategies because all the similar logic can be removed from both graphs, leaving just the differences exposed.

Figure 16:
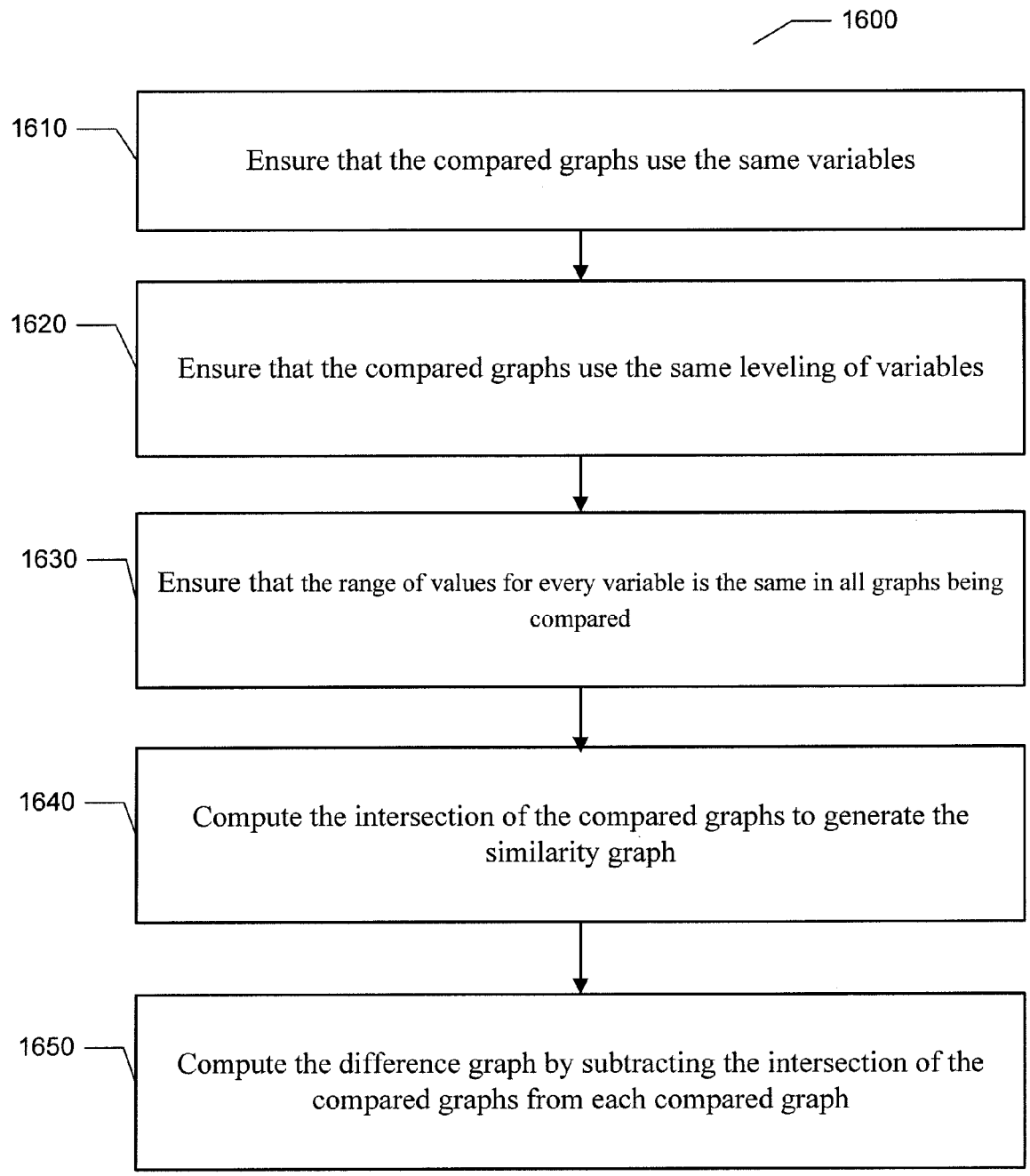
FIG. 16 illustrates a process flow that can be implemented by an algorithm that computes similarity and difference graphs.

FIG. 16 illustrates a process flow 1600 that can be implemented by an algorithm that computes similarity and difference graphs. At 1610, the process can ensure that the graphs use the same variables. If the graphs do not use the same variables, then "true nodes" can be added for the variables missing in some of those graphs. A "true node", for example, can be a node for a variable with a condition that covers all possible cases that can be seen for that variable. A "true node" can evaluate to true in the context of using the graph to determine which action to assign to a case.

At 1620, the process can ensure that the compared graphs use the same leveling of variables. If the compared graphs do not use the same leveling of variables, then some or all of the graphs can be transformed to use the same leveling as the others. At 1630, the process can ensure that the domain (range) of values for every variable is the same in all graphs being compared. If the range of values is not the same, then the union of domain ranges for that variable in all graphs can be used.

At 1640, the similarity graph can be generated by computing the intersection of the compared graphs. One example of the "Intersection" operation is described in the "Converting Unordered Graphs to Oblivious Read Once Ordered Graph Representation" patent application, application Ser. No. 12/206,514, filed on Sep. 8, 2008, and incorporated by reference hereto in its entirety. The "graph intersection" operation takes as a parameter two graphs and computes the intersection for them. In other words, Similarity Graph for G1, G2=Graph Intersection (G1, G2). To compute the similarity graph for three or more graphs, the "graph intersection" operation can be performed on the first two graphs, then its result passed to a second "graph intersection" operation along with the third graph. The result can be the intersection between all compared graphs. In other words, Similarity Graph for G1, G2, G3=Graph Intersection(Graph Intersection(G1, G2), G3). In this way, the similarity graph for multiple graphs can be determined. The result can be displayed in a graph viewer user interface.

At 1650, the difference graphs can be generated by subtracting the intersection of the compared graphs from each compared graph. In other words, Difference Graph for G1=Graph Subtract from G1 the Graph Intersection (G1, G2). Similarly, Difference Graph for G2=Graph Subtract from G2 the Graph Intersection(G1, G2).

Cross pair graphs can also be used to compare strategies. A cross pair graph can show all the logic that is assigned a particular action in a first strategy, and another action (could be the same action) in a second strategy. Cross pair graphs can be computed on a pair of strategies. Cross pair graphs can show similarities between the strategies when the action pair is for the same action (i.e. a "same-action" cross pair graph). Cross pair graphs can show differences between the strategies when the action pair is for different actions (i.e. a "different-action" cross pair graph).

A cross pair graph may not have an action node, it can just depict conditions that are assigned one action in one strategy, and another action in the second strategy. A cross pair graph can be displayed using the ground line display as discussed in our "Visualization of Decision Logic" patent application, application Ser. No. 12/201,400, filed on Aug. 29, 2008 and incorporated by reference hereto in its entirety. A cross pair graph can also be displayed by showing a terminal node much like an action node, except that it represents an action pair instead of a single action.

Each pair of actions from the two strategies can be compared to determine the intersection of those populations that get the first action of the pair in the first strategy, but would get the second action of the pair in the second strategy. The intersection, which is a logical expression, can then be rendered with a single graph. For example, a first strategy ("a champion strategy") can assign the actions "Action A", "Action B", or "Action C". A second strategy ("a challenger strategy") can assign the actions: "Action A" or "Action B". Then, comparing these two strategies with this methodology would generate up to six cross pair graphs, as illustrated in the TABLE 1 below:

TABLE 1

| Champion | Challenger | Cross Pair Graph shows logic that gets assigned: |
| --- | --- | --- |
| Action A | Action A | Action A in Champion and Action A in Challenger |
| Action A | Action B | Action A in Champion and Action B in Challenger |
| Action B | Action A | Action B in Champion and Action A in Challenger |
| Action B | Action B | Action B in Champion and Action B in Challenger |
| Action C | Action A | Action C in Champion and Action A in Challenger |
| Action C | Action B | Action C in Champion and Action B in Challenger |

In some instances, the cross pair graphs can be empty. The empty cross pair graphs can be generated if there is no logic that is assigned a given pair of actions by the two strategies.

Figure 17:
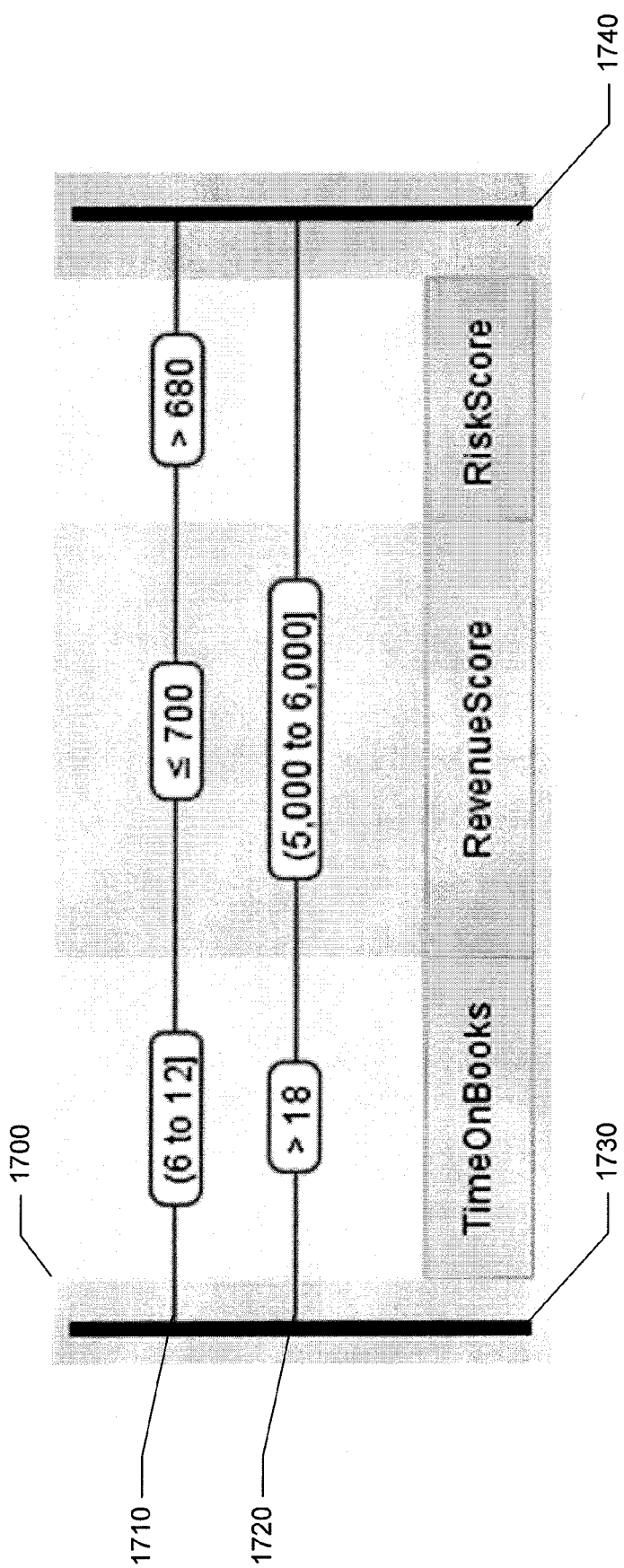
FIG. 17 provides one example of a cross pair graph.
Figure 18:
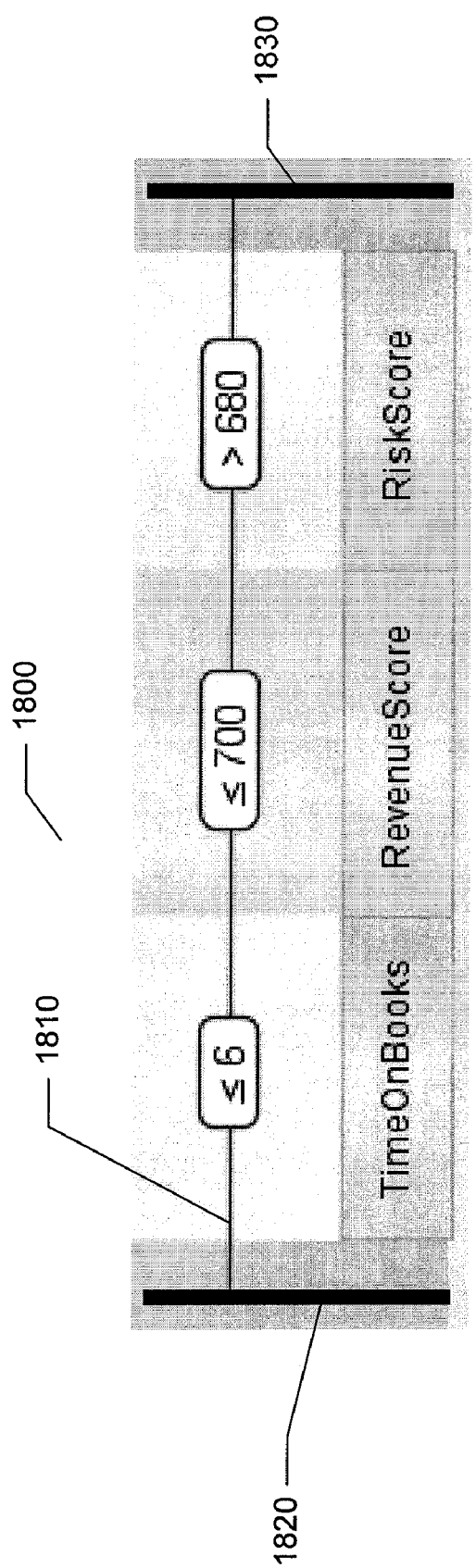
FIG. 18 provides another example of a cross pair graph.

FIG. 17 and FIG. 18 provide examples of cross pair graphs using the strategies compared in FIG. 2. Specifically, FIG. 17 illustrates the cross pair graph 1700 that represents the logic that is assigned the "open" action in the strategy 200 in FIG. 2 and assigned the "closed" action in the strategy 250. The cross pair graph 1700 illustrates two paths (1710, 1720) connecting the start line 1730 with the terminal line 1740. The path 1710 connects with the "(6 to 12]" node on TimeOnBooks through the "<=700" node on RevenueScore with the ">680" node on RiskScore. The path 1710 indicates that the condition: TimeOnBooks is in the range [6 to 12] AND RevenueScore<=700 AND RiskScore>680) is assigned the "open" action from the first strategy and the "closed" action from the second strategy.

FIG. 18, with continuous reference to FIG. 2, illustrates the cross pair graph 1800 corresponding to the logic that is assigned the "closed" action in the strategy 200 and assigned the "open" action in the strategy 250. There is a single path 1810 connecting the start line 1820 with the terminal line 1830. The path 1810 represents that the condition (TimeOnBooks≦6 AND RevenueScore≦700 AND RiskScore>680) is assigned the "closed" action by the first strategy and the "open" action by the second strategy.

Cross pair graphs can answer a question of the form: "describe all cases which are assigned Action A by the first strategy and Action B by the second strategy." Similarly, cross pair graphs can be used to determine which actions are assigned to the same cases in both strategies, what cases, assigned to Action A in the first strategy are assigned to the Action B in the second strategy and why. The cross pair graphs can also be used to determine whether there is a subset of actions that is assigned the same way by both strategies.

Cross pair graphs can present a more fine-grained view of the similarities and differences between two strategies than a similarity graph or a difference graphs. Cross pair graphs can allow an analyst to further drill down into finer depictions of the exact logical differences between the two strategies.

A similarity graph can lump together all logic that gets assigned the same action, without taking into a consideration which action that is. A same-action cross pair graph, however, may show just the logic that gets assigned a particular action by both strategies. In other words, the same-action cross pair graph can break down the similarity graph into smaller, more easily understood pieces. Different-action cross pair graphs can also show the subpopulations that get a specific change in treatment between the two strategies.

Figure 19:
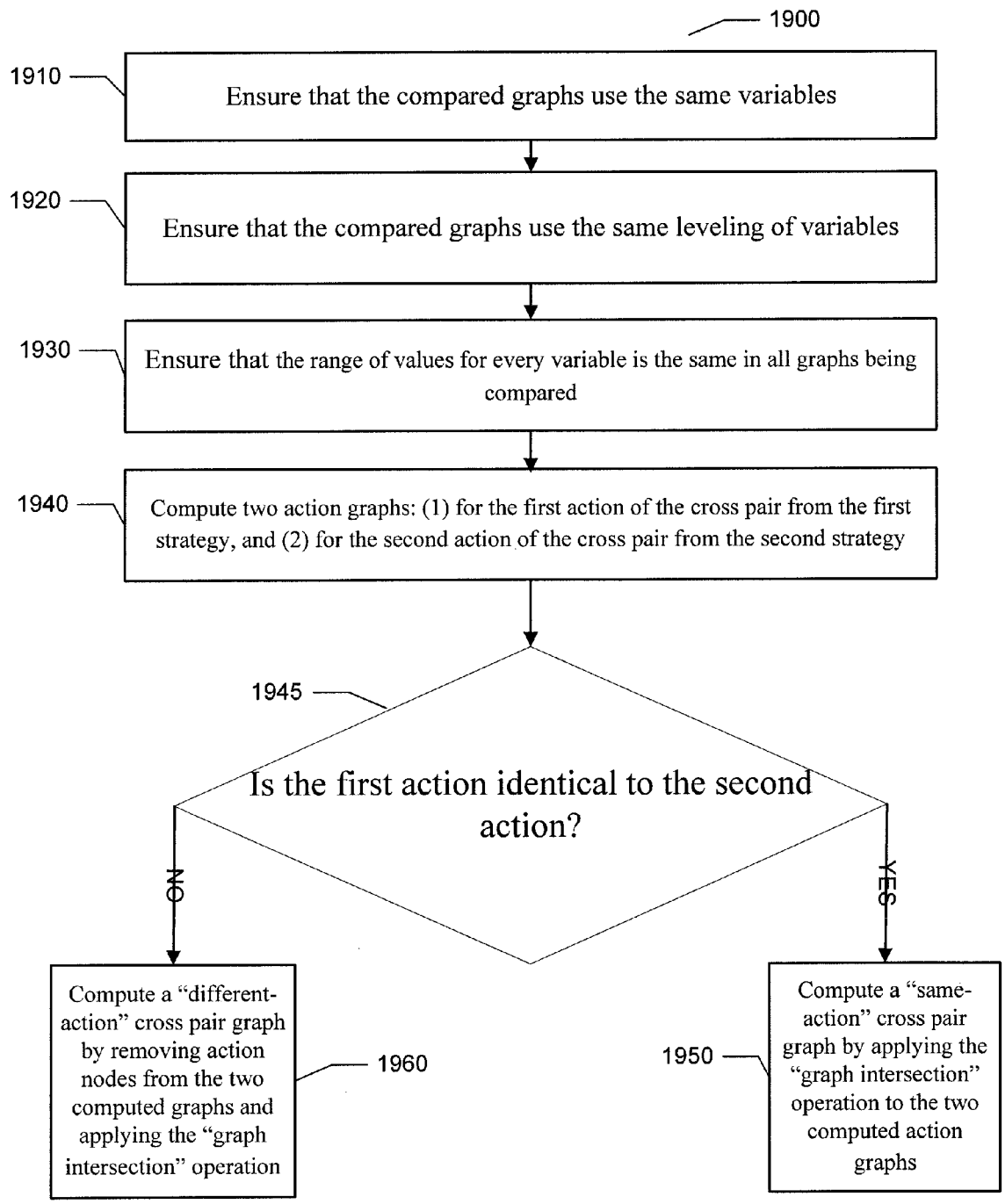
FIG. 19 illustrates one example of a process flow that can be used for computing cross pair graphs.

FIG. 19 illustrates one example of a process flow 1900 that can be used for computing cross pair graphs. At 1910, the process can ensure that the graphs use the same variables. If the graphs do not use the same variables, then "true nodes" can be added for the variables missing in some of those graphs. At 1920, the process can ensure that the compared graphs use the same leveling of variables. If the compared graphs do not use the same leveling of variables, then some or all of the graphs can be transformed to use the same leveling as the others. At 1930, the process can ensure that the domain (range) of values for every variable is the same in all graphs being compared. If the range of values is not the same, then the union of domain ranges for that variable in all graphs can be used.

At 1940, the process can compute the action graph for the first action of the cross pair from the first strategy, and the action graph for the second action of the cross pair from the second strategy. At 1945, the determination can be made whether the first action is identical to the second action.

If the first and the second actions are identical, at 1950, the "same-action" cross pair graph can be computed. For example, the same-action cross pair graph can be computed by calculating the "graph intersection" of the two action graphs computed at 1940. One example of the "Intersection" operation is described in the "Converting Unordered Graphs to Oblivious Read Once Ordered Graph Representation" patent application, application Ser. No. 12/206,514, filed on Sep. 8, 2008, and incorporated by reference hereto in its entirety.

In other words, Cross Pair Graph for Action A in G1, Action A in G2 =Graph Intersection (Action Graph for Action A in G1, Action Graph for Action A in G2). The resulted "same-action" cross pair graph can be displayed in a graphical user interface using the ground line display.

If the first and the second actions are different, at 1960, a "different-action" cross pair graph can be computed. For example, the "different-action" cross pair graph can be computed by removing the action nodes from each action graph before performing the "graph intersection" operation on them. If the action nodes are not removed, the intersection of two action graphs on two different actions will always return an empty graph. In other words, Cross Pair Graph for Action A in G1, Action B in G2=Graph Intersection (Action Graph for Action A in G1 with action node removed, Action Graph for Action B in G2 with action node removed).

Alternatively, the cross pair graph can be computed by: (1) joining the action node of action graph #1 and the start node of action graph #2 together to form one graph, (2) finding all of the decision chains through this new graph, (3) for each decision chain, finding the overlapping ranges of conditions on the same variable, (4) removing the decision chains without the overlapping ranges of conditions, otherwise, using the overlapping range for that condition, (4) finding any conditions that are true in each of the decision chains and placing them at the top of the final cross pair graph, and, (5) transforming the graph to use an optimal level of ordering that minimizes the number of nodes.

For example, if the first strategy assigns M actions, and the second strategy assign N action, then there may be as many M×N cross pair graphs. In practice, most of these cross pair graphs can be empty. In other words, there is no logic that matches the conditions represented by the cross pair graph. User interface controls can be provided for the user to choose an action for the first strategy from a list of all the actions assigned by the first strategy, and to choose an action for the second strategy from a list of all the actions assigned by the second strategy.

Figure 20:
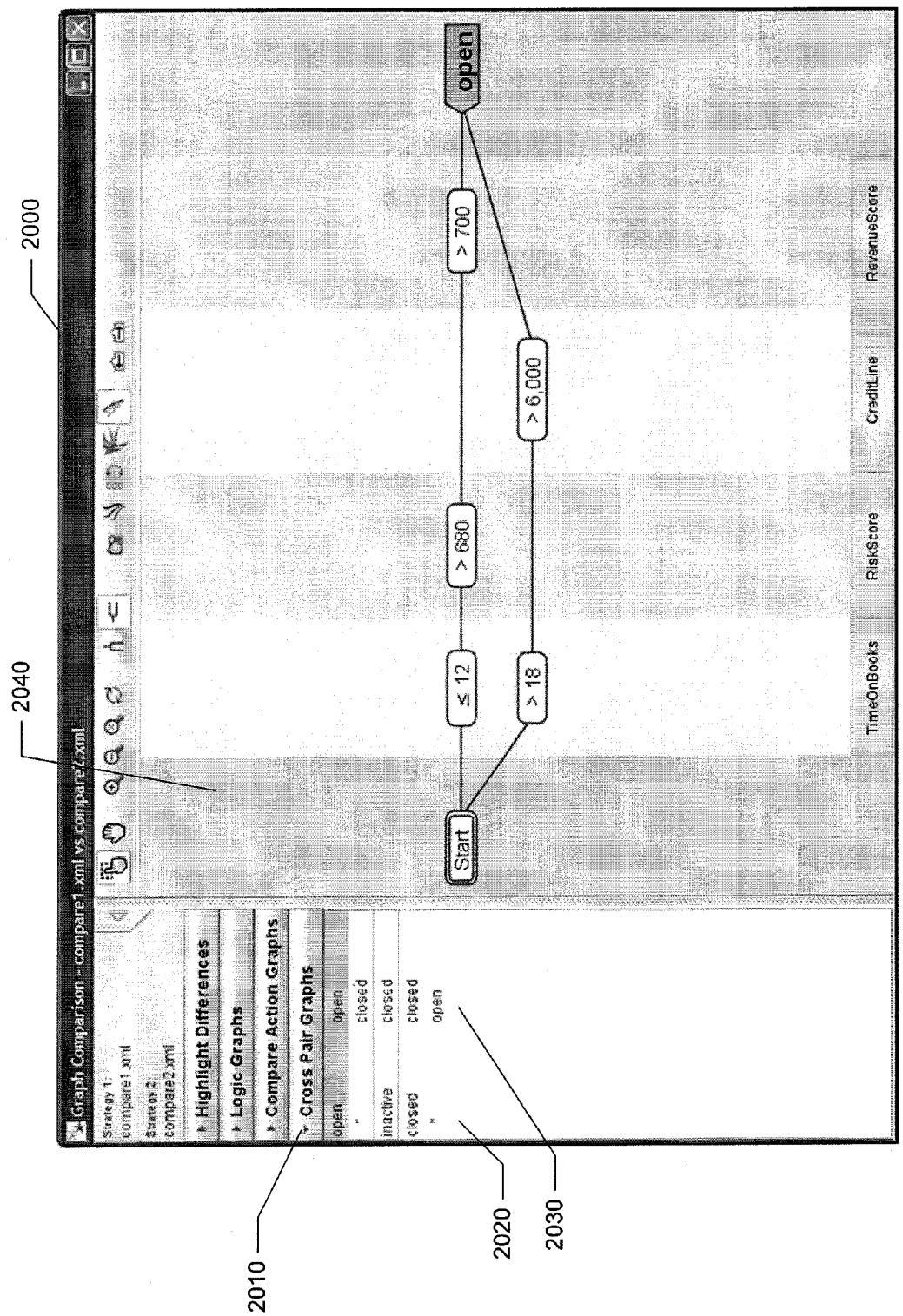
FIG. 20 illustrates one example of a user interface that can present the user with a list of the action pairs that have non-empty cross pair graphs.

FIG. 20 illustrates one example of a user interface 2000 that can present the user with a list of the action pairs 2010 that have non-empty cross pair graphs. The list 2010 can provide a summary of the similarities and differences between two strategies by itemizing the changes in treatment between the two strategies. In this list, the left column 2020 shows the actions assigned by the first strategy. The right column 2030 shows the actions assigned by the second strategy. To show a particular cross pair graph, the user can select the list item for that action pair. In response to the user's selection, the system can display the cross pair graph in the graph viewer 2040 on the right.

In some implementations, a crosstabulation table between the action sets assigned by both strategies can also be displayed to the user. The columns of the table can represent actions assigned by the first strategy. The rows of the table can represent actions assigned by the second strategy. The cells of the table can correspond to every possible action pair. A special marker can be displayed in cells that have an empty cross pair graph. Another marker can be displayed in cells that have a non-empty cross pair graph. Selecting the marker (e.g. by clicking on it) can show the corresponding cross pair graph in the graph viewer.

In some implementations, a user interface control that uses meta-information describing the graphs can be used to simplify the search for the graphs of interest. For example, an icon can be used to identify which actions have a different action graph in both strategies vs. actions that have the same action graph. An icon can also be used to identify action pairs that have a non-empty cross pair graph. The meta-information can be generated before the user has selected to view the graphs. The action graphs can be pre-computed and compared to each other in advance. Similarly, the cross pair graph on every combination of actions assigned by the two strategies can also be pre-computed.

The meta-information can also be generated without computing each complete action graph or cross pair graph. Instead, a system can display only those actions which are assigned differently or which action pairs have empty cross pair graphs or not. The complete action graph or cross pair graph can be computed only when the user has selected to display it.

Figure 21:
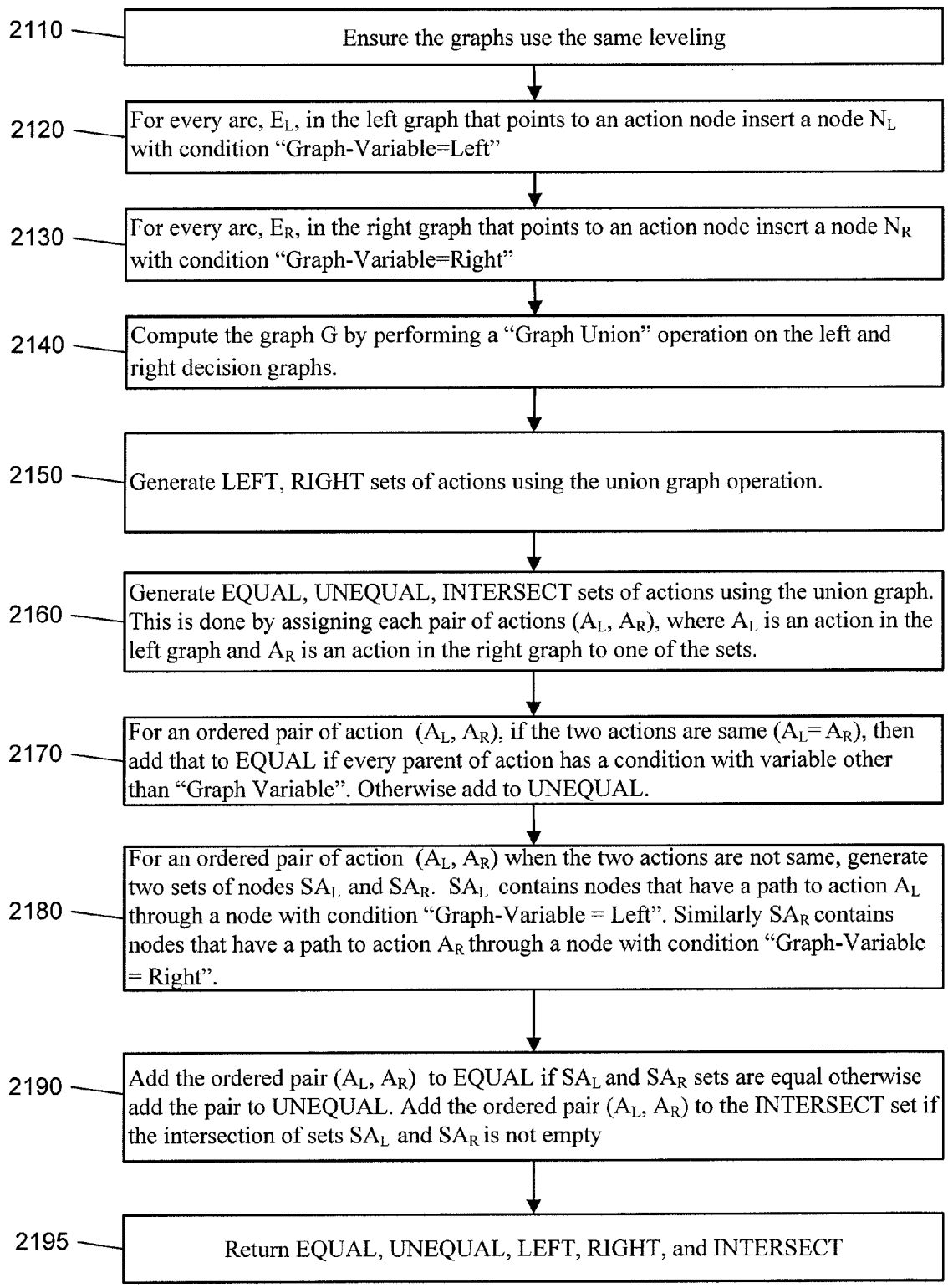
FIG. 21 illustrates a process flow that can be used to calculate the meta-information for navigation to a particular comparison display.

FIG. 21 illustrates a process flow 2100 that can be used by an algorithm to calculate the meta-information. The input to the algorithm is the two decision graphs and we will refer to them here as the "left graph" and the "right graph". For example, at 2110, the process can ensure that the graphs use the same leveling. In some implementations, the levels of one of the graphs can be reordered to use the same leveling as the other graph. The variable order may not be significant. An order which can be computed quickly can be used. Alternatively, both graphs can be reordered to use the same leveling.

At 2120 and 2130, a new categorical variable can be added to both graphs, with the name "Graph-Variable", which can take the category values "Left" or "Right". For example, at 2120, for every arc, $E_L$, in the left graph that points to an action node, a process can add a node, $N_L$, with condition "Graph-Variable=Left", add an arc from the source node of $E_L$ to $N_L$, add an arc from $N_L$ to the target node of $E_L$, and delete $E_L$.

Similarly, at 2130, for every arc, $E_R$, in the right graph that points to an action node, the process can add a node, $N_R$, with condition "Graph-Variable=Right", add an arc from the source node of $E_R$ to $N_R$, add an arc from $N_R$ to the target node of $E_R$, and delete $E_R$.

Figure 22:
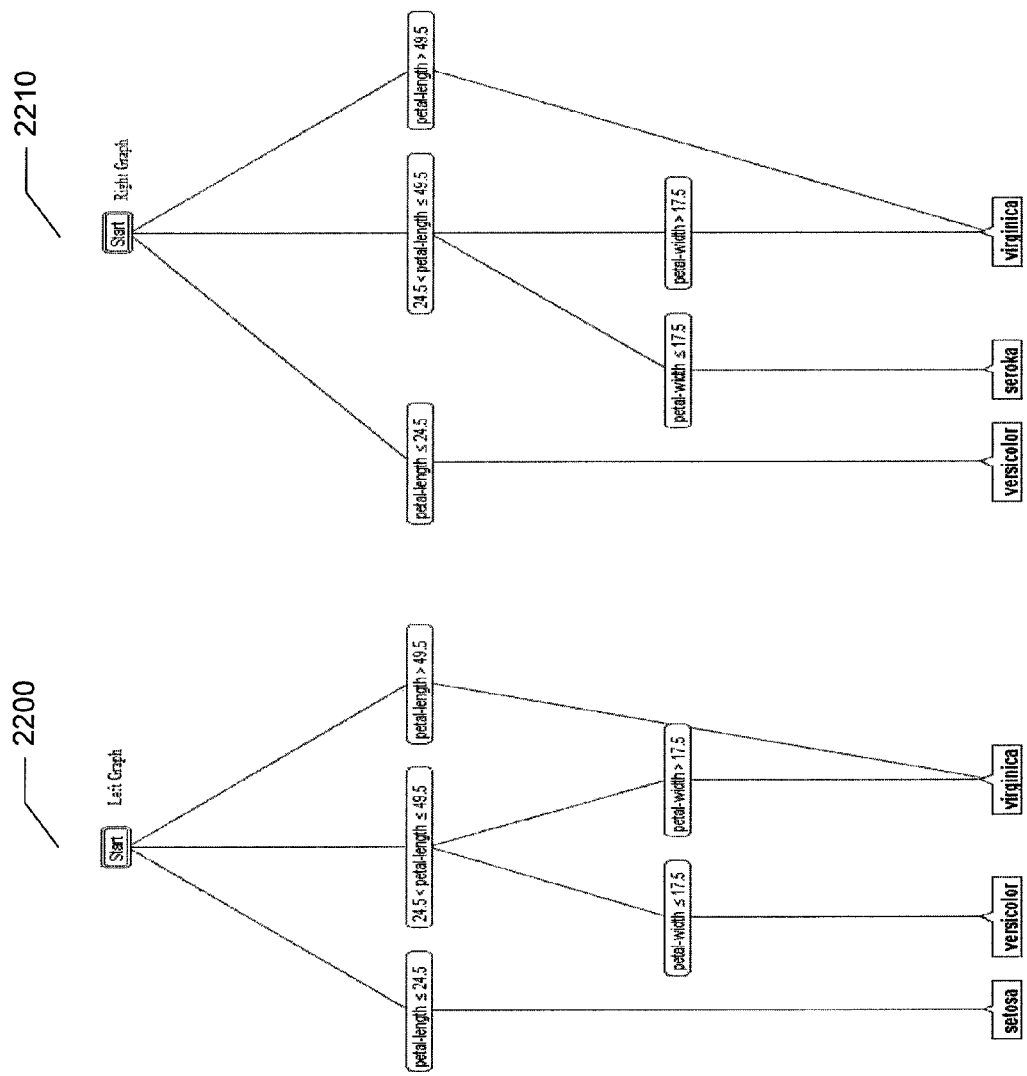
FIG. 22 illustrates two graphs that have been reordered to use the same leveling.
Figure 23:
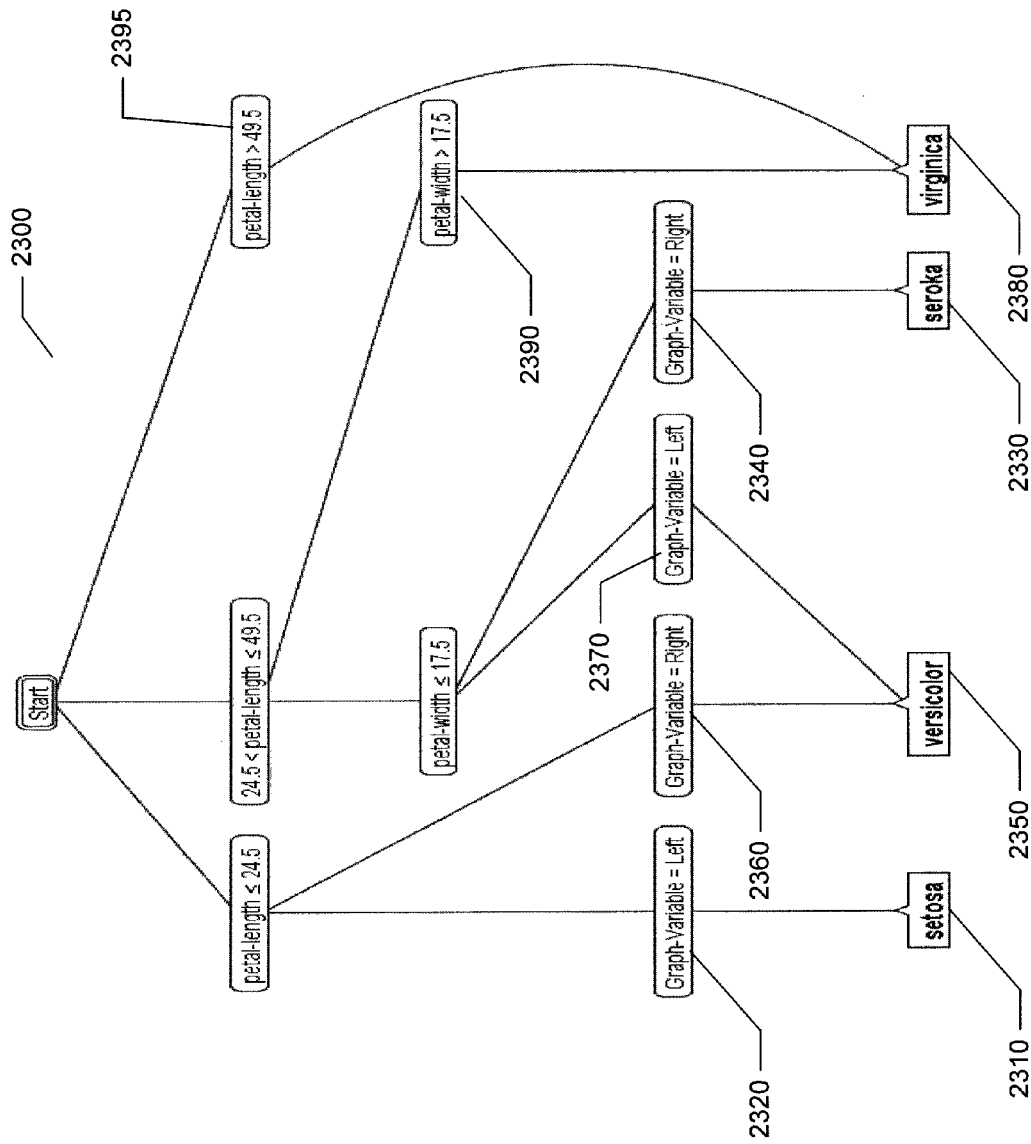
FIG. 23 illustrates an exemplary graph that was computed as a result of the "Graph Union" operation.

At 2140, a graph G can be computed by performing a "Graph Union" operation on the left and right decision graphs. For example, FIG. 22 illustrates two graphs 2200 and 2210 that have been reordered to use the same leveling. FIG. 23, illustrates the graph 2300 that was computed as a result of the "Graph Union" operation performed on graphs 2200 and 2210.

With continuous reference to FIG. 21, at 2150, two sets of actions can be generated: LEFT and RIGHT. For example, if the action node's only parent is "Graph-Variable=Left", then this action node can be added to the LEFT set. If the action node's only parent is "Graph-Variable=Right", this action node can be added to the RIGHT set. At 2160, three sets of actions can be generated: EQUAL, UNEQUAL and INTERSECT as detailed in steps 2170 to 2190. For example, every ordered pair of action ($A_L$, $A_R$) can be evaluated for membership to these sets.

At 2170, if the two actions are same ($A_L$=$A_R$) and every parent of each action has a condition with variable other than "Graph Variable", then the action pair can be added to the EQUAL set. Otherwise the action pair can be added to the UNEQUAL set. When the two actions are not same, at 2180, two sets of nodes $SA_L$ and $SA_R$ can be generated. $SA_L$ may contain nodes that have a path to action $A_L$ through a node with condition "Graph-Variable=Left". Similarly $SA_R$ may contain nodes that have a path to action $A_R$ through a node with condition "Graph-Variable=Right". At 2190, the ordered pair ($A_L$, $A_R$) can be added to the EQUAL set if $SA_L$ and $SA_R$ sets are equal otherwise the pair can be added to the UNEQUAL set. The ordered pair ($A_L$, $A_R$) can be added to the INTERSECT set if the intersection of sets $SA_L$ and $SA_R$ is not empty. The INTERSECT set can collect pairs of actions, such that the decision logic leading to them in the left and right graphs respectively has some logic common. Each pair of ordered actions ($A_L$, $A_R$), where $A_L$ is an action in the left graph and $A_R$ is an action in the right graph, can be added to INTERSECT if the intersection of sets $SA_L$ and $SA_R$ is not empty. If the two sets $SA_L$ and $SA_R$ are exactly identical, the pair is also added to EQUAL set and if different then it can be added to the UNEQUAL set.

For example, FIG. 23 illustrates an exemplary graph that can be generated to calculate the meta-information. The action node for "setosa" 2310 has only the parent node "Graph-Variable=Left" 2320. Consequently, "setosa" action is added to the LEFT set. The action node for "seroka" 2330 has only the parent node "Graph-Variable=Right" 2340, as a result, "seroka" 2330 can be added to the RIGHT set. The action node for "versicolor" 2350 has the two parents "Graph-Variable=Left" 2370 and "Graph-Variable=Right" 2360, so "versicolor" 2350 can be added to the UNEQUAL set. The action node for "virginica" 2380 has a parent 2390 and a parent 2395 on a variable other than "Graph-Variable", as a result, it is added to the EQUAL set.

At 2195, EQUAL, UNEQUAL, LEFT, RIGHT, and INTERSECT sets can be returned to the caller. For example, the EQUAL, UNEQUAL, LEFT and RIGHT sets can be used to display icons in front of actions to indicate which actions have equivalent or different action graphs. The INTERSECT set can be used to display the list of action pairs with non-empty cross pair graphs.

For example, FIG. 23 illustrates, inter alia, an action pair "setosa" 2310 and "versicolor" 2350. The corresponding sets for these two action can be: $SA_L$={"petal-length<=24.5"} and $SA_R$={"petal-length<=24.5"}. The intersection of these sets is {"petal-length<=24.5"}, which is not the empty set. Consequently, the action pair ("setosa", "versicolor") can be added to the INTERSECT set. The two sets are identical and also added to EQUAL.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. An article comprising a non-transitory machine-readable storage medium embodying instructions that when performed by one or more machines result in operations comprising:
   receiving a request to compare a first strategy to a second strategy, the first strategy graphically represented by a first set of linked nodes, the second strategy graphically represented by a second set of linked nodes, each set of linked nodes linking a root node to at least one action node;
   identifying a subset of linked nodes from at least one of the first set of linked nodes and the second set of linked nodes based on an equivalence of a first subset of the first set of linked nodes to a second subset of the second set of linked nodes; and
      determining the equivalence of the first subset to the second subset by subtracting a third subset of linked nodes from the first set of linked nodes and from the second set of linked nodes, the third subset representing one or more logical conditions corresponding to a common action from the first strategy and the second strategy;
   providing a visual depiction of the identified subset of the linked nodes to a user, the visual depiction corresponding to the equivalence of the first subset to the second subset.

2. The article of claim 1, wherein the non-transitory machine-readable storage medium further embodies instructions that when performed by one or more machines result in operations comprising:
   computing the third subset of linked nodes using a graph intersection operation.

3. The article of claim 1, wherein the non-transitory machine-readable storage medium further embodies instructions that when performed by one or more machines result in operations comprising:
   determining the equivalence of the first subset to the second subset by comparing at least one action node linked to the first subset and at least one action node linked to the second subset.

4. The article of claim 3, wherein the non-transitory machine-readable storage medium further embodies instructions that when performed by one or more machines result in operations comprising:
   determining the first subset equivalent to the second subset if and only if all action nodes linked to the first subset are identical to all action nodes linked to the second subset.

5. The article of claim 3, wherein the non-transitory machine-readable storage medium further embodies instructions that when performed by one or more machines result in operations comprising:

determining the first subset is determined not equivalent to the second subset if and only if none of the action nodes linked to the first subset are identical to action nodes linked to the second subset.

6. The article of claim 1, wherein the non-transitory machine-readable storage medium further embodies instructions that when performed by one or more machines result in operations comprising:
determining the equivalence of the first subset to the second subset based on a bottom-up isomorphism.

7. The article of claim 1, wherein the non-transitory machine-readable storage medium further embodies instructions that when performed by one or more machines result in operations comprising:
computing the bottom-up isomorphism by comparing a subset of links leading to action nodes of the first set of linked nodes with a subset of links leading to action nodes of the second set of linked nodes.

8. The article of claim 1, wherein the non-transitory machine-readable storage medium further embodies instructions that when performed by one or more machines result in operations comprising:
determining the equivalence of the first subset to the second subset based on a top-down isomorphism.

9. The article of claim 1, wherein the non-transitory machine-readable storage medium further embodies instructions that when performed by one or more machines result in operations comprising:
computing the top-down isomorphism by comparing a subset of links leading from the root node of the first set of linked nodes with a subset of links leading from the root node of the second set of linked nodes.

10. The article of claim 1, wherein the non-transitory machine-readable storage medium further embodies instructions that when performed by one or more machines result in operations comprising:
determining the equivalence of the first subset to the second subset based on a top-down isomorphism and a bottom-up isomorphism.

11. The article of claim 1, wherein the non-transitory machine-readable storage medium further embodies instructions that when performed by one or more machines result in determining the equivalence of the first subset to the second subset by instructions comprising:
for every link immediately preceding a first action node in the first strategy, updating the first strategy by linking a first tag node to the first action node;
for every link immediately preceding a second action node in the second strategy, updating the second strategy by linking a second tag node to the second action node;
computing a union graph of the first updated strategy and the second updated strategy; and,
determining the equivalence based on nodes of the union graph linked to the first tag node and the second tag node.

12. An article comprising a non-transitory machine-readable storage medium embodying instructions that when performed by one or more machines result in operations comprising:
receiving a first strategy and a second strategy for comparison, each strategy represented by at least one path of linked nodes, the at least one path linking a root node to an action node, thereby assigning at least one action to at least one population subset;
selecting a first collection of paths from the first strategy, each path in the first collection assigning a first action to a first population subset, such that the first population subset is not assigned to the first action by the second strategy;
calculating a third strategy based on the first collection of paths; and,
providing a visual depiction of the third strategy.

13. An article comprising a non-transitory machine-readable storage medium embodying instructions that when performed by one or more machines result in operations comprising:
receiving a request to compare a first strategy to a second strategy, the first strategy represented by a first set of linked nodes, the second strategy represented by a second set of linked nodes, each set of linked nodes linking a root node to at least one action node;
for every link leading to each action node in the first strategy, updating the first strategy by linking a first tag node to each action node;
for every link leading to each action node in the second strategy, updating the second strategy by linking a second tag node to the second action node; computing a union graph of the first updated strategy and the second updated strategy; computing a LEFT node collection by gathering each action node of the union graph linked to the first tag node but not to the second tag node;
computing a RIGHT node collection by gathering each action node of the union graph linked to the second tag node but not to the first tag node; providing a visual depiction based on the at least one of the LEFT and RIGHT node collections.

* * * * *